(12) United States Patent
Kugler et al.

(10) Patent No.: US 12,179,572 B2
(45) Date of Patent: Dec. 31, 2024

(54) CONVERTIBLE RECREATIONAL SIT-DOWN TO STAND-UP VEHICLE

(71) Applicant: Polaris Industries Inc., Medina, MN (US)

(72) Inventors: Jared S. Kugler, Erhard, MN (US); Michael J. Fuchs, Blaine, MN (US); Jacob L. Stock, Dellwood, MN (US); Kyle T. Roggenkamp, Stacy, MN (US); Anthony J. Kinsman, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/273,945

(22) PCT Filed: Jan. 28, 2022

(86) PCT No.: PCT/US2022/014215
§ 371 (c)(1),
(2) Date: Jul. 24, 2023

(87) PCT Pub. No.: WO2022/165110
PCT Pub. Date: Aug. 4, 2022

(65) Prior Publication Data
US 2024/0075801 A1    Mar. 7, 2024

Related U.S. Application Data

(60) Provisional application No. 63/143,294, filed on Jan. 29, 2021.

(51) Int. Cl.
*B60K 1/04* (2019.01)
*B62D 51/00* (2006.01)
(Continued)

(52) U.S. Cl.
CPC .............. *B60K 1/04* (2013.01); *B62D 51/008* (2013.01); *B62D 51/02* (2013.01); *B62K 13/00* (2013.01);
(Continued)

(58) Field of Classification Search
CPC ... B60K 1/04; B60K 1/00; B60K 1/02; B60K 2001/0438; B60K 2001/0405;
(Continued)

(56) References Cited

U.S. PATENT DOCUMENTS 6,412,583 B1 * 7/2002 Caple ...................... B60T 1/065
                                                                188/110
7,125,080 B1    10/2006 Jarema, III
(Continued)

FOREIGN PATENT DOCUMENTS

CN          102501931        6/2012
CN          102501931 A  *  6/2012
(Continued)

OTHER PUBLICATIONS

Wikipedia article "Axial flux motor"; https://en.wikipedia.org/wiki/Axial_flux_motor; Apr. 15 (Year: 2024).*
(Continued)

*Primary Examiner* — Keith J Frisby
(74) *Attorney, Agent, or Firm* — Faegre Drinker Biddle & Reath LLP

(57) ABSTRACT

According to certain embodiments, a convertible recreational vehicle comprises one or more front ground engaging members; one or more rear ground engaging members; a frame supported by the one or more front ground engaging members and the one or more rear ground engaging members. In addition, the convertible recreational vehicle comprises a steering assembly configured to steer the one or more front ground engaging members. In addition, the
(Continued)

convertible recreational vehicle includes a seat assembly supported by the frame and configured to support at least one rider and a motor configured to drive at least one of: (i) the one or more front ground engaging members and (ii) the one or more rear ground engaging members. Further, the convertible recreational vehicle includes a floor panel including a surface that extends across a width of the floor panel.

23 Claims, 28 Drawing Sheets

(51) Int. Cl.
    *B62D 51/02*     (2006.01)
    *B62K 5/01*     (2013.01)
    *B62K 13/00*     (2006.01)
    *B62K 15/00*     (2006.01)
    *B60K 1/00*     (2006.01)
    *B60K 31/00*     (2006.01)

(52) U.S. Cl.
    CPC ............ *B62K 15/00* (2013.01); *B62K 15/006* (2013.01); *B60K 2001/001* (2013.01); *B60K 2001/0438* (2013.01); *B60K 2031/0091* (2013.01); *B60Y 2200/124* (2013.01); *B62K 2015/001* (2013.01)

(58) Field of Classification Search
    CPC ...... B60K 2001/0472; B60K 2001/001; B60K 2031/0091; B62K 13/00; B62K 13/08; B62K 2015/001; B62K 15/006; B62K 15/00; B62K 21/24; B62K 23/02; B62K 2204/00; B62K 5/01; B60Y 2200/12; B60Y 2200/124; B60Y 2200/91; B62D 21/183; B62D 21/18; B62D 23/005; B62D 23/00; B62D 51/00; B62D 51/02; B62D 51/008; B62J 1/08; B62J 11/00; B60P 3/42; B60P 3/423; B60L 50/66
    USPC .... 180/21, 208, 209, 65.1, 65.51, 65.6, 233, 180/68.5; 280/638, 639, 30
    See application file for complete search history.

(56) References Cited

U.S. PATENT DOCUMENTS

| | | | |
|---|---|---|---|
| 9,365,254 B1 | 6/2016 | Durrett | |
| 9,533,729 B1 * | 1/2017 | Chan | B62J 1/08 |
| 10,729,603 B2 * | 8/2020 | Wang | B62K 5/003 |
| 11,230,342 B2 * | 1/2022 | Zhang | B62J 45/42 |
| 11,767,060 B2 * | 9/2023 | Hammond, Jr. | B62D 25/20 180/311 |
| 2007/0187164 A1 | 8/2007 | Yang | |
| 2011/0301825 A1 * | 12/2011 | Grajkowski | B60K 28/10 180/54.1 |
| 2013/0192908 A1 * | 8/2013 | Schlagheck | B62K 3/002 180/65.1 |
| 2014/0262583 A1 * | 9/2014 | Url | B62D 33/023 296/183.1 |
| 2015/0061263 A1 * | 3/2015 | Cheng | B62K 15/006 280/641 |
| 2015/0122570 A1 | 5/2015 | Miyashiro | |
| 2017/0259879 A1 | 9/2017 | Southey | |
| 2018/0178705 A1 * | 6/2018 | Fohrenkamm | B60P 3/42 |
| 2020/0156727 A1 * | 5/2020 | Chang | B62J 1/08 |
| 2020/0269916 A1 * | 8/2020 | Doerksen | B62K 5/10 |
| 2021/0038450 A1 * | 2/2021 | Ho | B62K 5/007 |
| 2021/0114654 A1 * | 4/2021 | Bonk | B62D 61/00 |
| 2021/0347313 A1 * | 11/2021 | Marquez Costa | B60R 13/0206 |
| 2024/0166293 A1 | 5/2024 | Rubanovich et al. | |

FOREIGN PATENT DOCUMENTS

| | | | | |
|---|---|---|---|---|
| CN | 108974196 | | 12/2018 | |
| CN | 108974196 A | * | 12/2018 | |
| CN | 111186520 A | * | 5/2020 | ............ A45C 9/00 |
| DE | 20110981 | | 9/2001 | |
| GB | 2385038 | | 8/2003 | |
| GB | 2385038 A | * | 8/2003 | ............ B62K 5/007 |
| JP | S60136275 U | * | 9/1985 | |
| JP | 2000264104 | | 9/2000 | |
| JP | 2000264104 A | * | 9/2000 | ............ B60N 2/14 |
| JP | 2013009794 | | 1/2013 | |
| JP | 2013009794 A | * | 1/2013 | |
| JP | 2013106896 A | * | 6/2013 | |
| WO | WO-2014111848 A1 | * | 7/2014 | ............ B62K 15/008 |
| WO | WO-2019224435 A1 | * | 11/2019 | ............ B60J 5/02 |
| WO | 2020/160406 | | 8/2020 | |

OTHER PUBLICATIONS

International Search Report and Written Opinion as issued by the International Searching Authority, dated Jun. 14, 2022, for International Patent Application No. PCT/US2022/14215;13 pages.

International Preliminary Report on Patentability, issued by the International Preliminary Examining Authority, dated May 7, 2024, for International Patent Application No. PCT/US2022/014215; 33 pages.

* cited by examiner

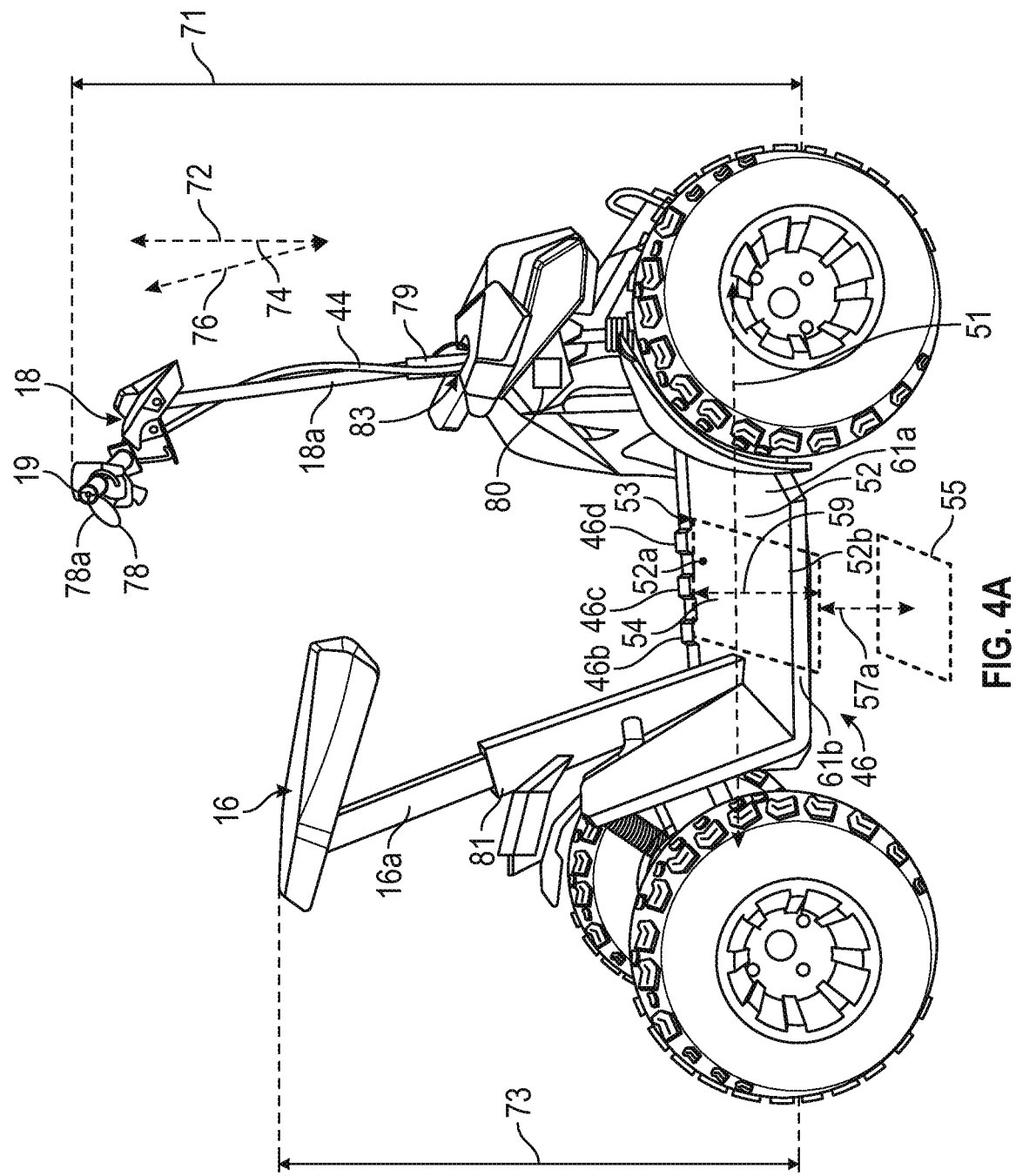

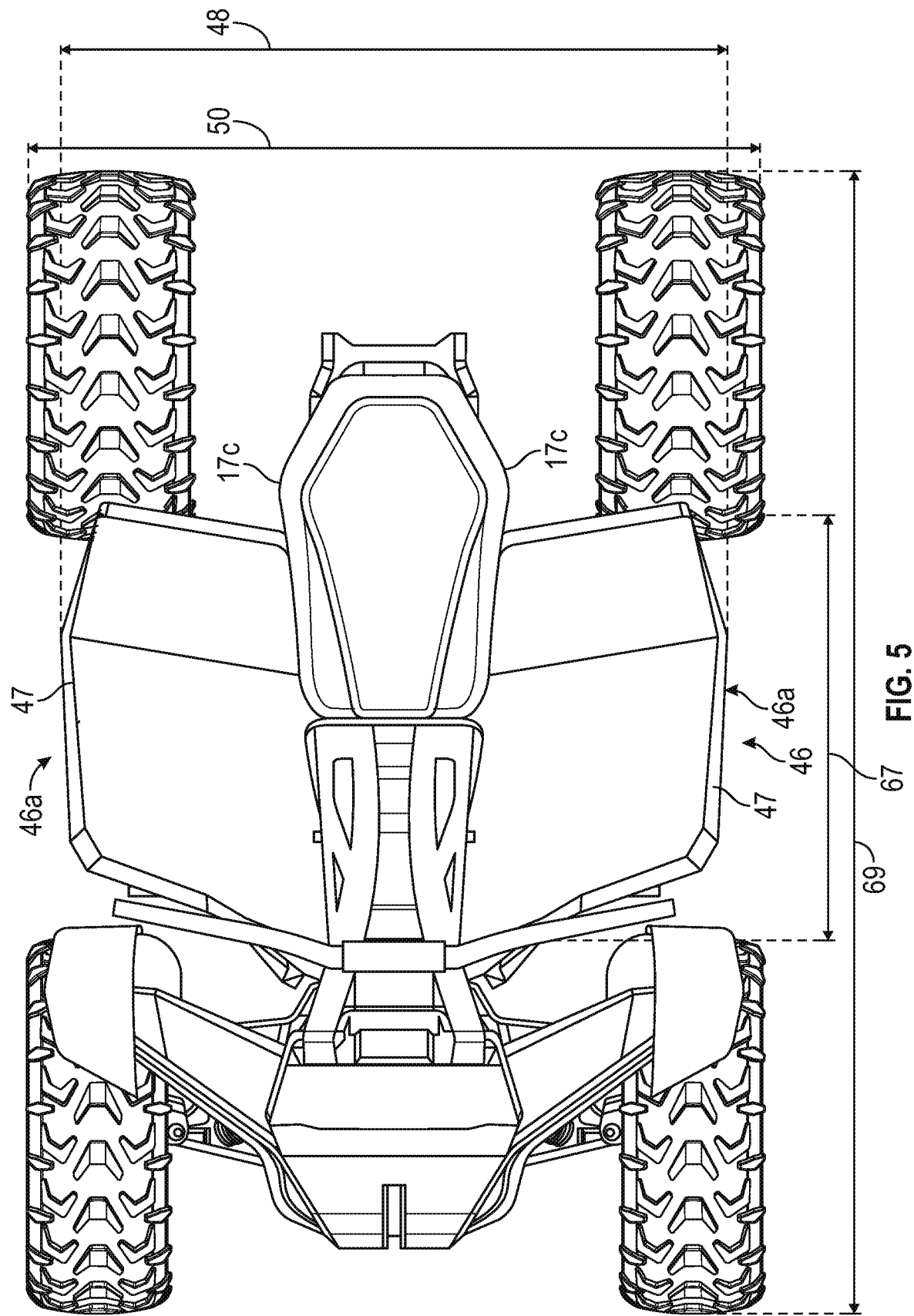

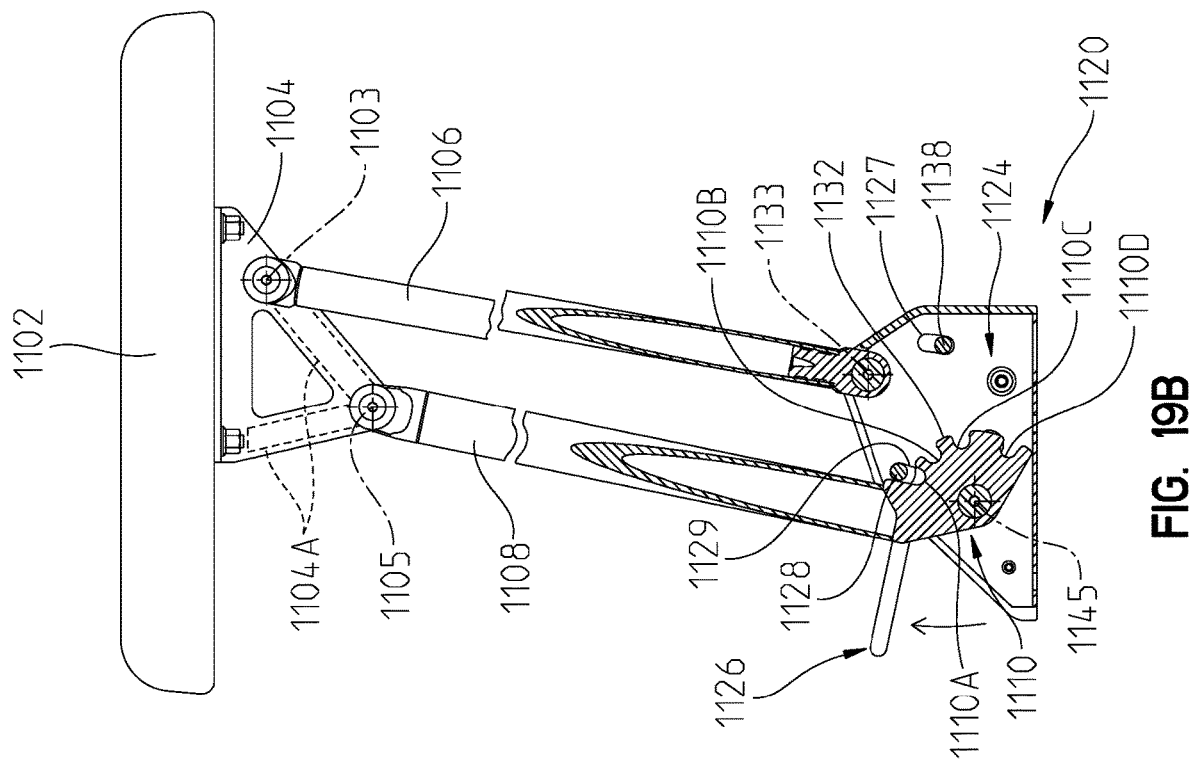
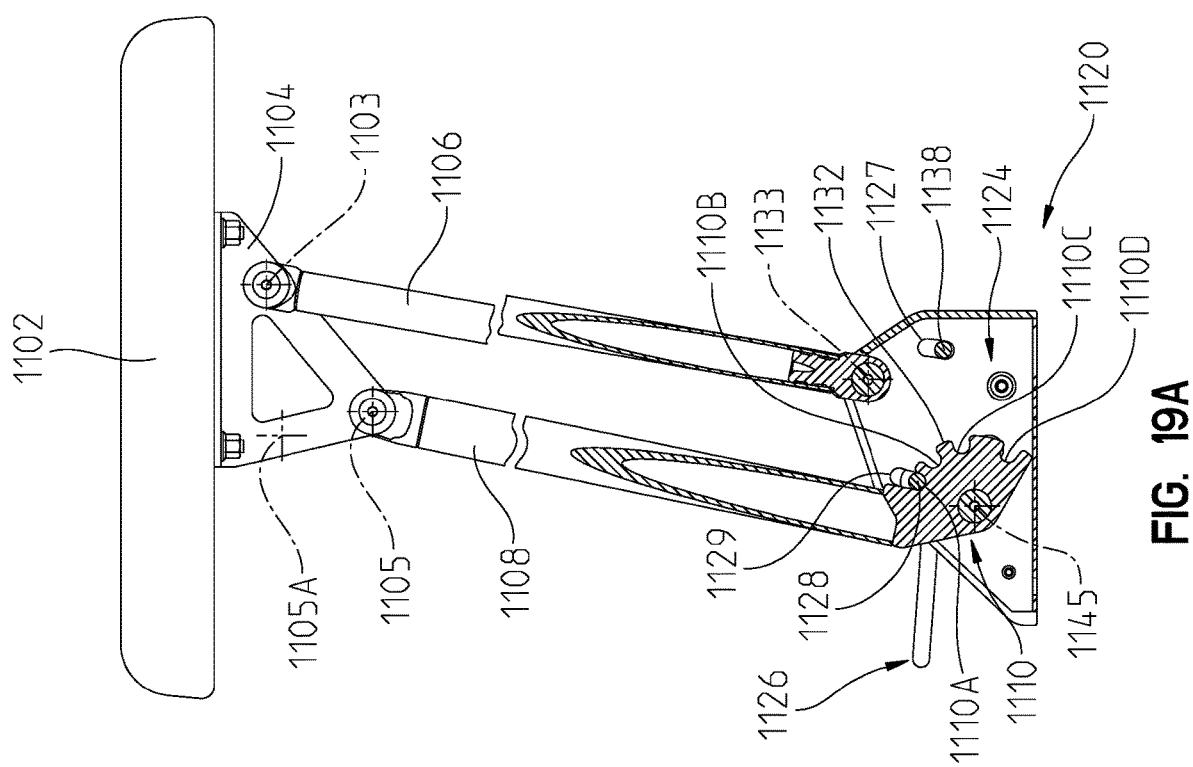

CONVERTIBLE RECREATIONAL SIT-DOWN TO STAND-UP VEHICLE

RELATED APPLICATIONS

The present application is a national stage entry of International (PCT) Patent Application Number PCT/US2022/014215, filed Jan. 28, 2022, which claims priority of U.S. Provisional Patent Application No. 63/143,294, filed Jan. 29, 2021, titled CONVERTIBLE RECREATIONAL SIT-DOWN TO STAND-UP VEHICLE, docket PLR-00TC-28247.01P-US, the entire disclosures of which are expressly incorporated by reference herein.

TECHNICAL FIELD

Embodiments of the present disclosure relate to recreational vehicles. More particularly, embodiments of the present disclosure relate to a convertible recreational vehicle capable of converting from a sit-down recreational vehicle to a stand-up vehicle.

BACKGROUND

Generally, recreational vehicles are sit-down vehicles. To increase the use cases of a recreational vehicle, it would be advantageous to be able to use the recreational vehicle while standing, as well. Further, a stand-up recreational vehicle could cater to different size riders more easily than a sit-down recreational vehicle.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a convertible recreational vehicle. Example embodiments include, but are not limited to the following embodiments.

In certain examples, a convertible recreational vehicle, comprises: one or more front ground engaging members; one or more rear ground engaging members; a frame supported by the one or more front ground engaging members and the one or more rear ground engaging members; a steering assembly configured to steer the one or more front ground engaging members; a seat assembly supported by the frame and configured to support at least one rider; a motor configured to drive at least one of: (i) the one or more front ground engaging members and (ii) the one or more rear ground engaging members; and a floor panel including a surface that extends across a width of the floor panel.

In at least one example thereof, the convertible recreational vehicle further comprises a divider comprising a first end that is coupled to a front portion of the convertible recreational vehicle and a second end that is configured to contact the seat assembly, wherein the first end is coupled to the front portion in a manner that allows the divider to rotate about an axis perpendicular to a plane bisecting the convertible recreational vehicle.

In at least one example thereof, the floor panel includes a raised edge along at least one side of the floor panel.

In at least one example thereof, the steering assembly is translatable along a vertical axis or along an oblique axis relative to the vertical axis.

In at least one example thereof, the convertible recreational vehicle further comprises a locking mechanism configured to lock the steering assembly at a positioned height.

In at least one example thereof, the seat assembly is translatable along a vertical axis or along an oblique axis relative to the vertical axis.

In at least one example thereof, the convertible recreational vehicle further comprises a locking mechanism configured to lock the seat assembly at a positioned height.

In at least one example thereof, the seat assembly is translatable along a horizontal axis.

In at least one example thereof, the steering assembly comprises at least one headlight.

In at least one example thereof, the convertible recreational vehicle further comprises at least one battery.

In at least one example thereof, the battery is integrated into the floor panel.

In at least one example thereof, the battery is located above the floor panel.

In at least one example thereof, the seat assembly includes a hinge mechanism that allows the seat assembly to be tilted forward.

In at least one example thereof, a ground clearance of the floor panel is greater than six inches and less than twelve inches.

In at least one example thereof, the convertible recreational vehicle further comprises body panels releasably coupled to the frame by spring clips.

In at least one example thereof, the motor is mounted on a rear swing arm of the convertible recreational vehicle.

In at least one example thereof, the motor is an axial flux motor.

In at least one example thereof, the floor panel comprises at least one coupler that couples a front portion of the convertible recreational vehicle to a back portion of the convertible recreational vehicle.

In at least one example thereof, the at least one coupler is a hinge mechanism allowing the front portion to rotate relative to the back portion.

In at least one example thereof, decoupling the at least one coupler decouples the front portion from the back portion.

In at least one example thereof, the convertible recreational vehicle further comprises a controller configured to: receive a tether signal indicating a user has released at least one of the user's hands from the steering assembly; and send a brake signal to a brake of the convertible recreational vehicle.

In at least one example thereof, the convertible recreational vehicle further comprises an electronic throttle and a controller, wherein the controller is configured to: receive a speed signal from a user device; and limit a maximum speed of the convertible recreational vehicle based upon the speed signal.

In at least one example thereof the convertible recreational vehicle further comprises a lockable storage area.

In at least one example thereof, the lockable storage area is a forward lockable storage area.

In certain examples, a user device, comprises: a processor; and memory comprising instructions that when executed by the processor cause the processor to: determine a speed of a convertible recreational vehicle; determine riders included in a group ride; and transmit the speed of the convertible recreational vehicle to each rider included in the group ride.

In at least one example thereof, the speed is transmitted to a user device associated with each rider of the group ride.

In at least one example thereof, the speed is transmitted to a controller incorporated into a convertible recreational vehicle associated with each rider.

In at least one example thereof, the memory further comprises instructions that when executed by the processor cause the processor to: receive a request from a user to turn on the convertible recreational vehicle; and send a single to a controller of the recreational vehicle to turn on a motor of the recreational vehicle.

In at least one example thereof, the memory further comprises instructions that when executed by the processor cause the processor to: receive a request from a user to turn off the convertible recreational vehicle; and send a single to a controller of the recreational vehicle to turn off a motor of the recreational vehicle.

In certain examples, a convertible recreational vehicle, comprises: one or more front ground engaging members; one or more rear ground engaging members; a frame supported by the one or more front ground engaging members and the one or more rear ground engaging members; a steering assembly configured to steer the one or more front ground engaging members; a seat assembly supported by the frame and configured to support at least one rider; a motor configured to drive at least one of: (i) the one or more front ground engaging members and (ii) the one or more rear ground engaging members; and a divider comprising a first end that is coupled to a front portion of the convertible recreational vehicle and a second end that is configured to contact the seat assembly, wherein the first end is coupled to the front portion in a manner that allows the divider to rotate about an axis perpendicular to a plane bisecting the convertible recreational vehicle.

In at least one example thereof, the convertible recreational vehicle further comprises a floor panel including a flat top surface that extends across a width of the floor panel.

In at least one example thereof, the floor panel includes a raised edge along at least one side of the floor panel.

In at least one example thereof, the steering assembly is translatable along a vertical axis or along an oblique axis relative to the vertical axis.

In at least one example thereof, the convertible recreational vehicle further comprises a locking mechanism configured to lock the steering assembly at a positioned height.

In at least one example thereof, the seat assembly is translatable along a vertical axis or along an oblique axis relative to the vertical axis.

In at least one example thereof, the convertible recreational vehicle further comprises a locking mechanism configured to lock the seat assembly at a positioned height.

In at least one example thereof, the seat assembly is translatable along a horizontal axis.

In at least one example thereof, the steering assembly comprises at least one headlight.

In at least one example thereof, the convertible recreational vehicle further comprises at least one battery.

In at least one example thereof, the at least one battery is integrated into the floor panel.

In at least one example thereof, the at least one battery is located above the floor panel.

In at least one example thereof, the seat assembly includes a hinge mechanism that allows the seat assembly to be tilted forward.

In at least one example thereof, a ground clearance of the floor panel is greater than six inches and less than twelve inches.

In at least one example thereof, the convertible recreational vehicle further comprises body panels releasably coupled to the frame by spring clips.

In at least one example thereof, the motor is mounted on a rear swing arm of the convertible recreational vehicle.

In at least one example thereof, the motor is an axial flux motor.

In at least one example thereof, the floor panel comprises at least one coupler that couples a front portion of the convertible recreational vehicle to a back portion of the convertible recreational vehicle.

In at least one example thereof, the at least one coupler is a hinge mechanism allowing the front portion to rotate relative to the back portion.

In at least one example thereof, decoupling the at least one coupler decouples the front portion from the back portion.

In at least one example thereof, the convertible recreational vehicle further comprises a controller configured to: receive a tether signal indicating a user has released at least one of the user's hands from the steering assembly; and send a brake signal to a brake of the convertible recreational vehicle.

In at least one example thereof, the convertible recreational vehicle further comprises an electronic throttle and a controller, wherein the controller is configured to: receive a speed signal from a user device; and limit a maximum speed of the convertible recreational vehicle based upon the speed signal.

In at least one example thereof, the lockable storage area is a forward lockable storage area.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4A-B is another side view of the example convertible recreational vehicle illustrated in FIGS. 1-2, in accordance with embodiments of the present disclosure;

FIG. 5 is a top view of the example convertible recreational vehicle illustrated in FIGS. 1-2, in accordance with embodiments of the present disclosure;

FIG. 19A is a cross-section view of the seating assembly of the vehicle of FIG. 15 in a locked, highest position, taken along section line 19-19 of FIG. 17;

FIG. 19B is a cross-section view of the seating assembly of the vehicle of FIG. 15 in an unlocked position, taken along section line 19-19 of FIG. 17;

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
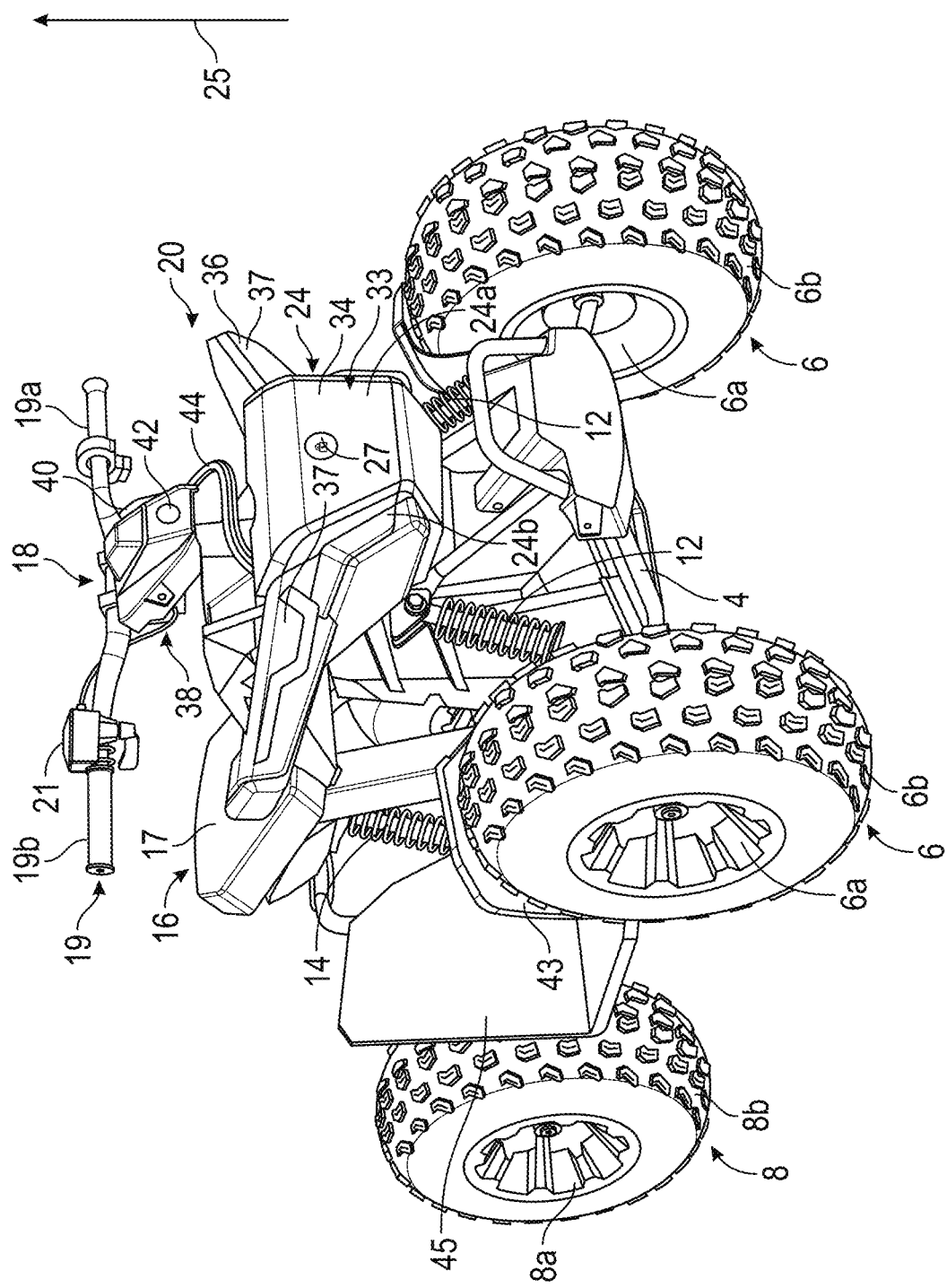
FIG. 1 is a front perspective view of an example convertible recreational vehicle, in accordance with certain embodiments of the present disclosure.
Figure 2:
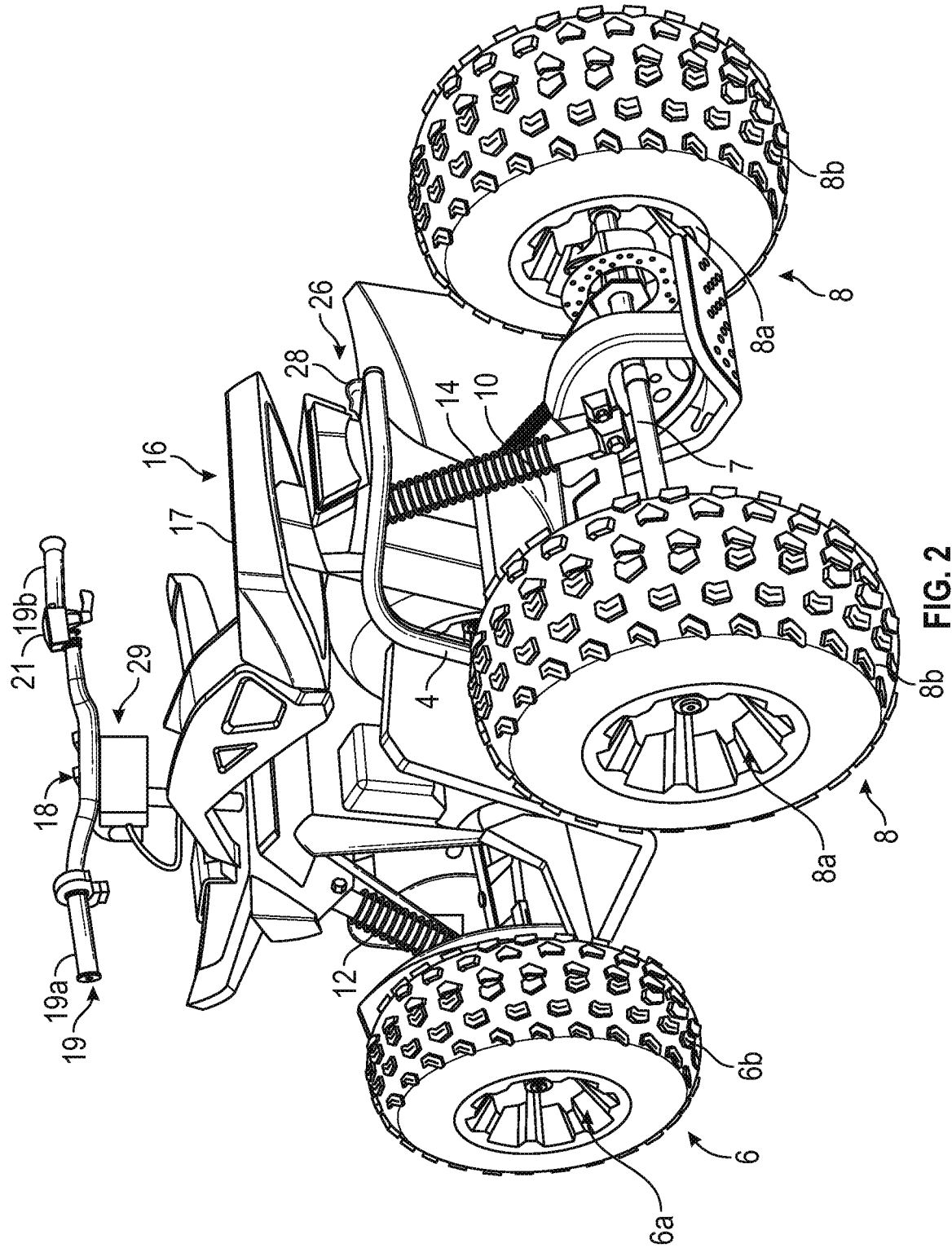
FIG. 2 is a rear perspective view of the example convertible recreational vehicle illustrated in FIG. 1, in accordance with embodiments of the present disclosure.

FIG. 1 is a front perspective view of an example convertible recreational vehicle and FIG. 2 is a rear perspective view of the example convertible recreational vehicle illustrated in FIG. 1. FIGS. 1 and 2 are merely examples, which should not unduly limit the scope of the claims. One of ordinary skill in the art would recognize many variations, alternatives, and modifications.

As illustrated, the convertible recreational vehicle 2 includes a frame 4 coupled to and supported by front ground-engaging members 6 and rear ground-engaging members 8. Convertible recreational vehicle 2 travels relative to a ground surface on front ground-engaging members 6 and rear ground-engaging members 8. Front ground-engaging members 6 include wheels 6a and tires 6b, and rear ground-engaging members 8 include wheels 8a and tires 8b. In some embodiments, the convertible recreational vehicle 2 can be used: exclusively on-road, exclusively off-road, or on-road and off-road.

The rear ground-engaging members 8 are coupled to an axle 7 that is driven by a motor 10. In certain aspects, the motor 10 can be an internal combustion motor or an electric motor. In instances where the motor 10 is an electric motor, the motor 10 can have some or all of the functionality of the motor described in U.S. Provisional Patent Application No. 63/143,240 filed on Jan. 29, 2021, and entitled, "Youth Electric Vehicle," the entire contents of which is incorporated herein for all purposes.

Front ground-engaging members 6 are coupled to frame 4 by way of a front suspension 12, and rear ground-engaging members 8 are coupled to frame 4 by way of a rear suspension 14. Convertible recreational vehicle 2 further includes a seat assembly 16, illustratively a saddle or straddle type seat 17. While seat assembly 16 as shown in FIG. 1 is for a single rider or operator, it is contemplated that convertible recreational vehicle 2 may be modified to incorporate two riders as described in U.S. Pat. No. 8,678,464 or 8,430,442, the disclosures of which are incorporated herein by reference.

Convertible recreational vehicle 2 also includes a steering assembly 18 for steering at least front ground-engaging members 8. Steering assembly 18 could be similar to that described in U.S. Pat. No. 8,122,993, titled POWER STEERING FOR AN ALL TERRAIN VEHICLE, filed Aug. 14, 2008. In the illustrative embodiment shown, steering assembly 18 includes handlebars 19, illustratively left handlebar 19a and right handlebar 19b. Handlebars 19 can include at least one operator input for controlling one or more features or characteristics of convertible recreational vehicle 2 such as, for example, a throttle 21. The throttle 21 can be a mechanical throttle or an electronic throttle. In embodiments where the throttle 21 is electronic, the throttle 21 can be speed and/or location controlled, as explained in more detail below.

In aspects, convertible recreational vehicle 2 includes a forward storage area 24 positioned forward of steering assembly 18. In aspects, the forward storage area 24 includes an upper portion 24a coupled to a lower portion 24b. The upper portion 24a is attached to the lower portion via a hinge or other coupling mechanism that allows a user to lift the upper portion 24a in an upward direction 25 relative to the lower portion 24b. In aspects, a battery for the convertible recreational vehicle 2 can be stored in the forward storage area 24. Additionally, or alternatively, the forward storage area 24 can include a lock 27 that allows a user to lock and unlock the forward storage area 24.

Figure 11:
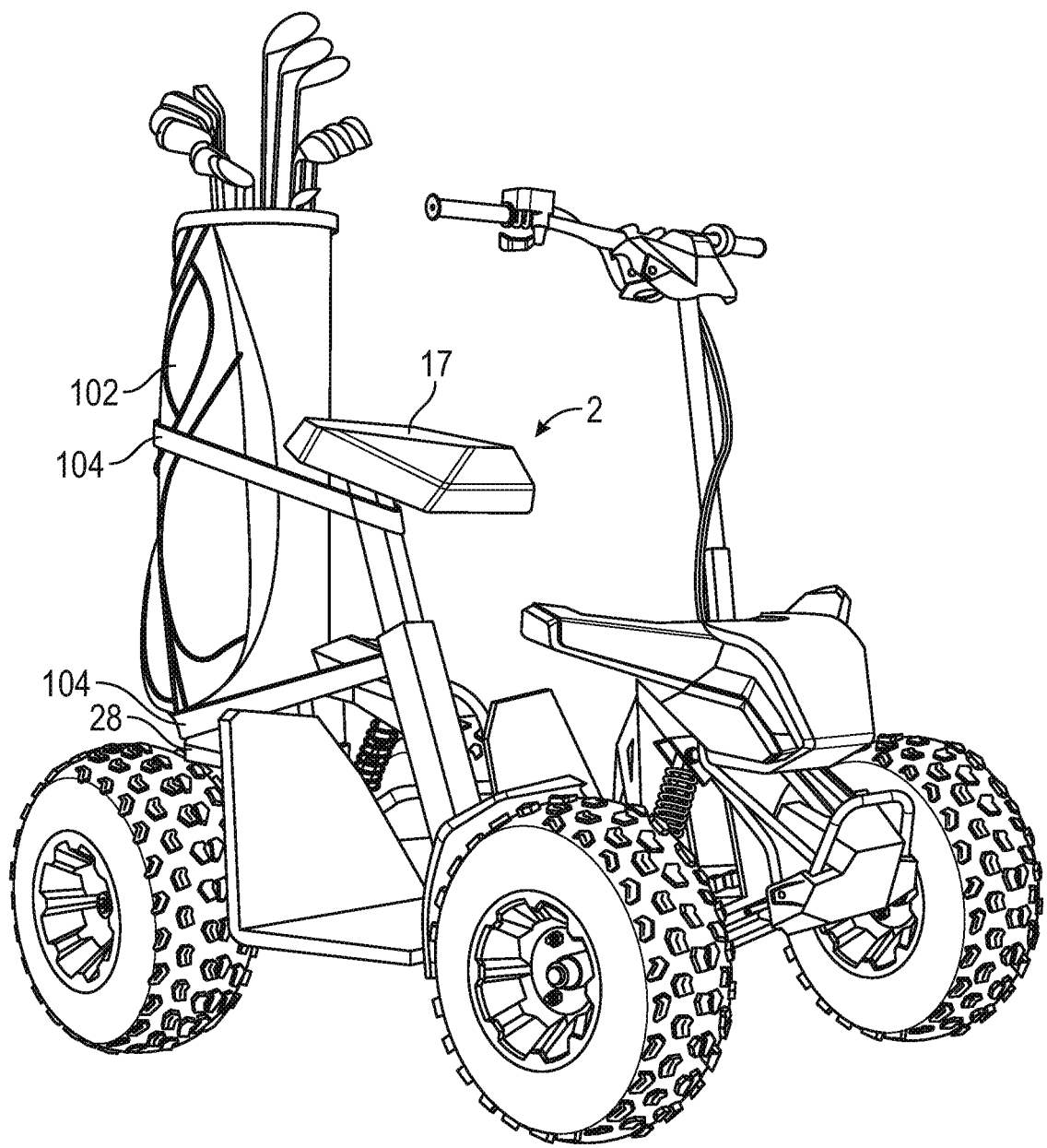
FIG. 11 is a perspective view of the convertible recreational vehicle including an accessory, in accordance with embodiments of the present disclosure.

According to certain embodiments, convertible recreational vehicle 2 includes a rear storage area 26 positioned rearward of seat 17. Rear storage area 26 includes a rear cargo rack 28 configured to support cargo (e.g., as illustrated in FIG. 11). It should be appreciated that rear cargo rack 28 could include integrated tie downs such as those described in U.S. Pat. No. 8,905,435, the entire disclosure of which is incorporated herein by reference.

In aspects, convertible recreational vehicle 2 may include a second forward storage area 29 (shown in FIG. 2), positioned proximal (e.g., underneath) steering assembly 18. In certain examples, the second forward storage area 29 may be configured to releasably couple a user device (e.g., user device 106), such as a mobile phone. To do so, in at least some embodiments, second forward storage area 29 includes one or more bands that can be arranged around a portion of the user device 106, such as extending from a first side of the user device 106 across the user device 106 to a second side of the user device 106 that is opposite the first side and/or around corners of the user device 106. In some instances, the user device 106 can function as a display for the convertible recreational vehicle 2. In these instances, the user device 106 can be coupled to the convertible recreational vehicle 2 via a wired or a non-wired (e.g., wirelessly) connection and can display information about the vehicle (e.g., speed, sensor measurements, various codes, etc.), navigation information, etc.

Outer body 20 may further include a first front body panel 33 including front fascia 34 and front fairing 36. The front fascia 34 may be the upper portion 24a of the forward storage area 24 in certain aspects. Additionally, or alternatively, the front fairing 36 can include headlights 37. In some examples, the outer body 20 also includes a second front body panel 38 including a front fascia 40 and a light pod 42. In some examples, the first front body panel 33 and the second front body panel 38 may be two separate pieces (as shown) or a single integral piece. The light pod 42 can be powered by one or more batteries via one or more cords 44. In aspects, the one or more batteries may be stored in the forward storage area 24, as stated above.

According to certain aspects, the outer body 20 includes front fenders 43 and rear fenders 45 arranged proximal the front and rear ground engaging members 6, 8 to prevent dirt, mud, and other material from spraying the rider.

In aspects, any portions of the outer body 20 are replaceable and/or interchangeable, in the event a portion of the outer body 20 gets damaged or depending on the use case of the convertible recreational vehicle 2. For example, the first front body panel 33, the front fascia 34, the front fairing 36, the second front body panel 38, the front fascia 40, the front fenders 43, and/or the rear fenders 45 can be replaceable and/or interchangeable. In certain instances, the one or more portions of the outer body 20 may include one or more spring clip arms that engage one or more bosses protruding from the frame 4.

Figure 3:
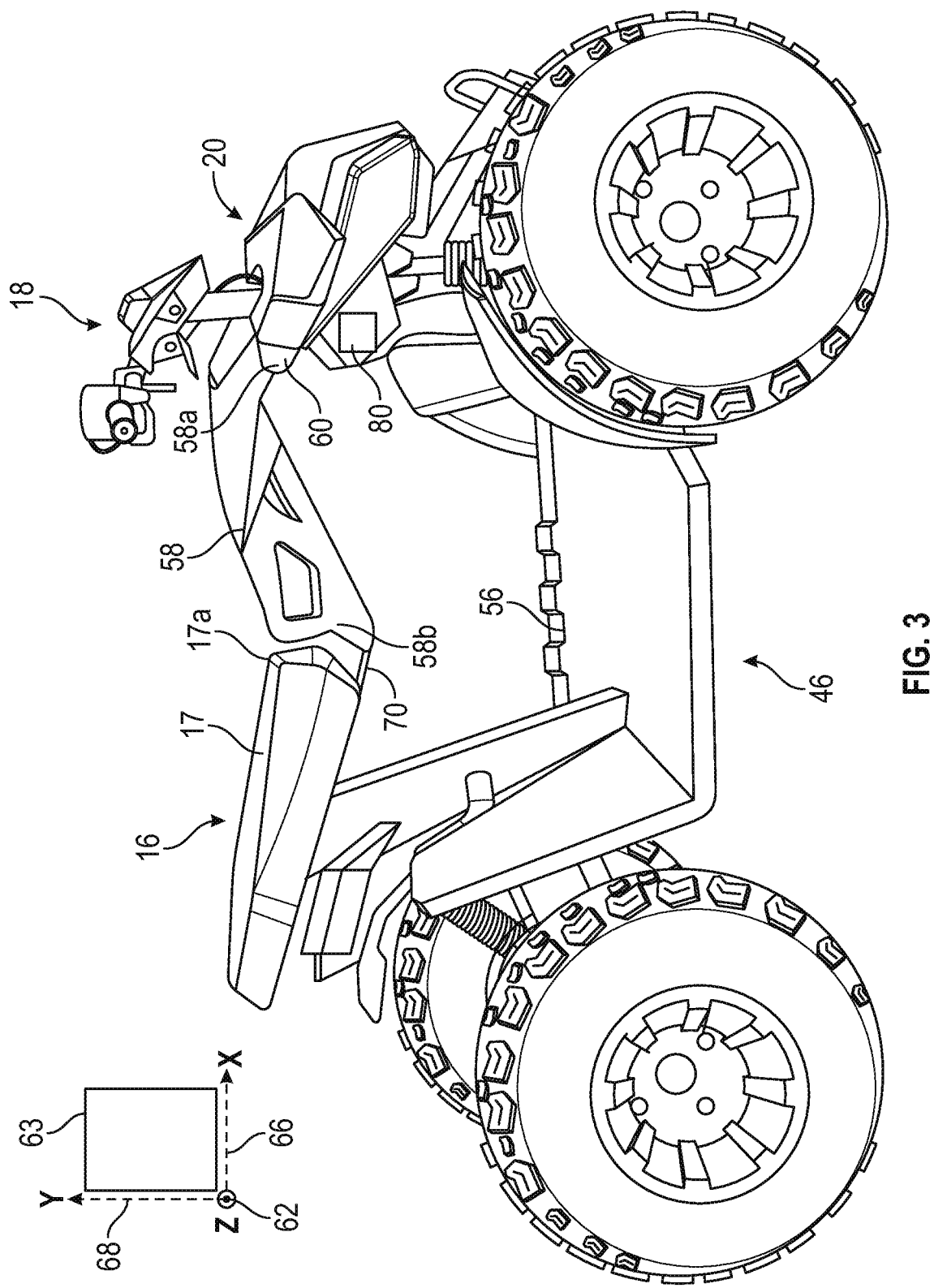
FIG. 3 is a side view of the example convertible recreational vehicle illustrated in FIGS. 1-2, in accordance with embodiments of the present disclosure.

FIGS. 3-5 illustrate a first side view of the convertible recreational vehicle 2, a second side view of the convertible recreational vehicle 2, and a top-down view of the convertible recreational vehicle 2, respectively. These diagrams are merely examples, which should not unduly limit the scope of the claims. One of ordinary skill in the art would recognize many variations, alternatives, and modifications.

As illustrated, the convertible recreational vehicle 2 includes a floor panel 46. In aspects, the width 48 of the floor panel 46 is less than a width 50 of the convertible recreational vehicle 2 (shown in FIG. 5), where the width 50 of the convertible recreational vehicle 2 is measured from the outside of the ground engaging members 6, 8. Alternatively, a width 48 of the floor panel 46 can be approximately equal to a width 50 of the convertible recreational vehicle 2. Alternatively, a width 48 of the floor panel 46 can be greater than a width 50 of the convertible recreational vehicle 2.

Due to the width 48 of the floor panel 46, a rider can stand on the floor panel 46 with the rider's feet shoulder width apart or greater, which allows the rider to have better balance while using the convertible recreational vehicle 2.

In some aspects, the width 48 of the floor panel 46 can range from between 18 inches to 40 inches. Additionally, or alternatively, the length 67 of the floor panel 46 can range from between 18 inches to 48 inches. In some embodiments, the width 50 of the convertible recreational vehicle 2 can range from between 24 inches to 40 inches. Additionally, or alternatively, the length 69 of the convertible recreational vehicle 2 can range from between 50 inches to 58 inches. In some aspects, the convertible recreational vehicle 2 can have a maximum length 69. For example, the maximum length 69 of the convertible recreational vehicle 2 can be 58 inches. Due to the maximum length 69, the convertible recreational vehicle 2 can be used in environments and/or stored in areas that alternative recreational vehicles cannot be used and/or stored due to the alternative recreational vehicles having a larger length. In some embodiments, the length 69 of the convertible recreational vehicle 2 to the width 50 of the convertible recreational vehicle 2 can be determined by a ratio. For example, the ratio of the length 69 of the convertible recreational vehicle 2 to the width 50 of the convertible recreational vehicle 2 can be less than or equal to 2. For example, in embodiments where the length 69 of the convertible recreational vehicle 2 is 52 inches and the width 50 of the convertible recreational vehicle 2 is 26 inches, the ratio is 52/26=2.0.

In at least some embodiments, the floor panel 46 includes a raised edge 47 along at least the sides 46a of the floor panel 46. The raised edge 47 may reduce the likelihood that a rider's feet slide off the floor panel 46 while the rider is operating the convertible recreational vehicle 2.

Figure 4B:
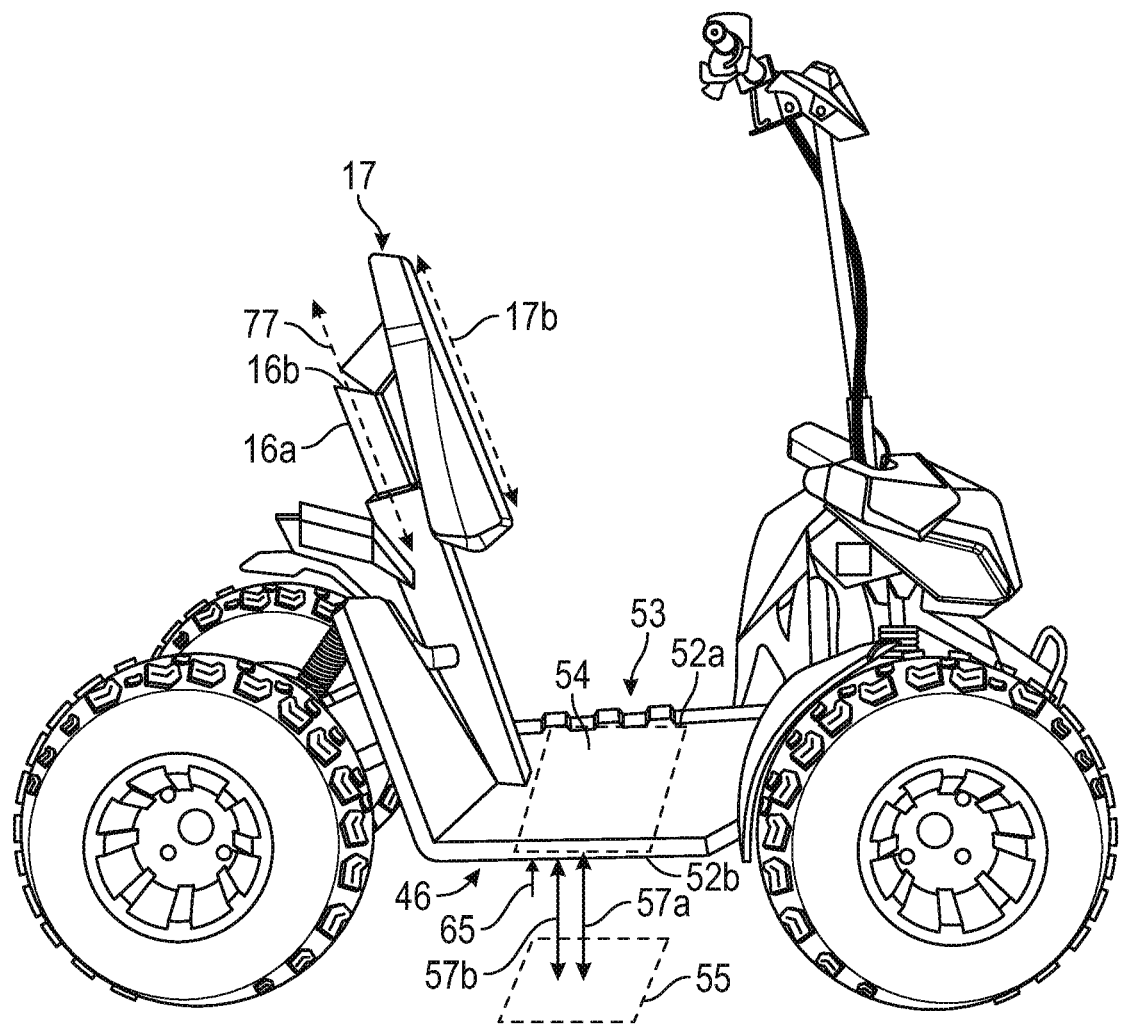

In aspects, the floor panel 46 has a substantially flat top surface 52. For example, a top surface 52 of the floor panel 46 can be tangential to a plane 54 extending across the width 48 of the floor panel 46, as illustrated in FIGS. 4A-4B. In some examples, multiple points 52a, 52b of the top surface 52 of the floor panel 46 are tangential to the plane 54. In aspects, the points 52a, 52b can be located on each side of a midline 51 that bisects the convertible recreational vehicle 2 in half. In certain instances, floor panel includes ridges 46b, 46c, 46d that extend across a portion of the width 48 of the floor panel 46 and the top portions of the ridges 46b, 46c, 46d form the top surface of the floor panel 46. Because the top surface 52 extends tangential to a plane 54 along a width 48 of the floor panel 46, a user has more surface area to position the user's feet and/or carry cargo, which can lower the center of gravity while a rider uses the convertible recreational vehicle 2. Furthermore, as explained in more detail below, when the convertible recreational vehicle 2 is being used as a stand-up vehicle, a user does not have to step over a middle portion (e.g., divider 58). Stated another way, there is unhindered pass-through in the center portion 53 of the convertible recreational vehicle 2.

According to certain embodiments, the top surface 52a of the floor panel 46 can be spaced apart from a ground surface 55 by a distance 57a. In certain aspects, the distance 57a may be a range from seven inches to fifteen inches. In some exemplary embodiments, the distance 57a is less than twelve inches so that a user can easily step on and off the floor panel 46. Additionally, or alternatively, the bottom surface 52b of the floor panel 46 can be spaced apart from a ground surface 55 by a distance 57b. In certain aspects, the distance 57b may be a range from four inches to eleven inches. In comparison to alternative recreational vehicles, the distance 57*a* and/or distance 57*b* between the floor panel 46 and the ground surface 55 is smaller. Due to the distance 57*a* and/or distance 57*b* between the floor panel 46 and the ground surface 55 being smaller, the convertible recreational vehicle 2 is more stable due to its lower center of gravity than alternative recreational vehicles. As such, inexperienced and/or less experienced users are able to more easily use the convertible recreational vehicle 2 than alternative recreational vehicles.

Additionally, or alternatively, the thickness 65 of the floor panel 46 can be between 1 inch and 5 inches. In some embodiments, the thickness 65 of the floor panel 46 can accommodate one or more batteries. According to certain embodiments, batteries included in the convertible recreational vehicle 2 may be located above a bottom surface of the floor panel 46. For example, any batteries included in the convertible recreational vehicle 2 do not protrude below a bottom surface 52*b* of the floor panel 46 to prevent the batteries from being accidentally impacted while the convertible recreational vehicle 2 is being used. In certain examples, batteries may be included in the floor panel 46 to lower the center of gravity of the convertible recreational vehicle 2. Batteries included in the convertible recreational vehicle 2 may include batteries to power the motor 10 in the event the motor 10 is an electric motor or one or more other batteries to power other electronics of the convertible recreational vehicle 2, such as the headlights 37 and/or light pod 42.

In aspects, the floor panel 46 can include one or more slots 56 extending entirely through the floor panel 46. The slots 56 can help clear any debris that deposits on the floor panel 46. In addition, the slots 56 will allow water to pass through the slots 56.

As illustrated, the convertible recreational vehicle 2 includes two different configurations shown in FIG. 3 and FIG. 4. In the first configuration, a rider can use the convertible recreational vehicle 2 as a sit-down vehicle. In the second configuration, a rider can use the convertible recreational vehicle 2 as a stand-up vehicle. In some embodiments of the first configuration, a divider 58 may extend between a front portion 60 of the convertible recreational vehicle 2 and a front portion 17*a* of the seat 17, as shown in FIG. 3. In view of the divider 58 spanning a front portion 17*a* of the seat 17 and a front portion 60 of the convertible recreational vehicle 2, a rider can lean against the divider 58 with the rider's knees and/or other portions of the rider's legs in order to stabilize the rider. This ability reduces the likelihood a rider will fall off the convertible recreational vehicle 2 while using the convertible recreational vehicle 2. As such, while in the first configuration, a rider may use the convertible recreational vehicle 2 as an ATV.

In some aspects, a first end 58*a* of the divider 58 is coupled to the front portion 60 by a coupling mechanism that allows the divider 58 to be rotated about a z-axis 62 that is perpendicular to a plane 63 bisecting the convertible recreational vehicle 2. As illustrated, the plane 63 extends along an x-axis 66 and a y-axis 68. For example, the first end 58*a* is coupled to the front portion 60 by a hinge mechanism. The first end 58*a* may also referred to herein as the front end 58*a* of the divider 58. In aspects, the front portion 60 forms a portion of the outer body 20 and is distal to the steering assembly 18.

Further, while the convertible recreational vehicle 2 is in a first configuration, the second end 58*b* of the divider 58 that is opposite the first end 58*a* is proximal to front portion 17*a* of the seat 17. The second end 58*b* may also be referred to herein as the rear end 58*b* of the divider 58. In aspects, the second end 58*b* includes a contour that is a complementary contour of the front portion 17*a* of the seat 17, as illustrated. For example, the contours fit with each other. As such, the front portion 17*a* of the seat 17 can secure the divider 58 in place. Additionally, or alternatively, the front portion 17*a* of the seat 17 or the second end 58*b* of the divider 58 can include a latch 70 to secure the divider 58 in place. While in some aspects of the present disclosure the convertible recreational vehicle 2 includes the divider 58 in other aspects of the present disclosure the convertible recreational vehicle 2 does not include the divider 58.

In the first configuration, the seat assembly 16 can be positioned in a first position. The first position of the seat assembly 16 may include positioning the seat assembly 16 as low as the seat assembly 16 is able to be positioned. Alternatively, the seat assembly 16 may positioned higher than as low as the seat assembly 16 is able to be positioned.

To transition the convertible recreational vehicle 2 between the first configuration shown in FIG. 3 and the second configuration shown in FIG. 4, in instances where the recreational vehicle 2 includes the divider 58, the divider 58 may be rotated about the z-axis 62 downward so the second end 58*b* of the divider 58 is proximal the floor panel 46, as shown in FIG. 4. By rotating the divider 58 downward, a user is able to step onto the floor panel 46 without having to step over the divider 58. While in the second configuration, a rider can use the convertible recreational vehicle 2 as a stand-up vehicle. Additionally, or alternatively, a rider can sit on the seat 17 and/or kneel on the seat 17 while using the convertible recreational vehicle 2 in the second configuration.

In certain aspects, the steering assembly 18 includes a steering column 18*a* that is parallel to the vertical axis 72 and is adjustable upward and downward along a vertical axis 72 to accommodate different size riders. Alternatively, the steering assembly 18 includes a steering column 18*a* that is at a non-zero angle 74 relative to the vertical axis 72. As such, the steering assembly 18 is adjustable upward and downward along an oblique axis 76 relative to the vertical axis 72 to accommodate different size riders. In examples, the angle 74 of the steering column 18*a* relative to the vertical axis 72 is greater than zero degrees and less than ninety degrees (e.g., the angle 74 may be 4 degrees, 6 degrees, 8 degrees, 10 degrees, 12 degrees, etc.). According to certain embodiments, the steering assembly 18 includes a locking mechanism 79 that locks the steering assembly 18 in place at a desired height. Additionally, or alternatively, the convertible recreational vehicle 2 can include a conduit 83 for receiving the cord 44 and/or any brake lines when the steering assembly 18 is lowered. In aspects, the conduit 83 includes a retraction mechanism to coil the cord 44 and/or any brake lines as the steering assembly 18 is being lowered.

In examples, the steering assembly 18 is translatable upward and downward along the vertical axis 72 or oblique axis 76 between zero inches and up to and including thirty-six inches. In some examples, the steering assembly 18 is translatable by at least a minimum distance. For example, the steering assembly 18 can be translatable by at least six inches. Additionally, or alternatively, the steering assembly 18 has a height 71 that includes a minimum and maximum height relative to the floor panel 46. For example, the height 71 of the steering assembly 18 relative to the floor panel 46 can include a minimum height of 26 inches relative to the floor panel 46 and a maximum height of 42 inches relative to the floor panel 46. In some embodiments, the maximum height relative to the minimum height of the steering assembly 18 can be determined by a ratio. For example, the ratio of the maximum height to the minimum height of the steering assembly 18 can be greater than or equal to 1.5. For example, in embodiments where the maximum height of the steering assembly 18 relative to the floor panel 46 is 42 inches and the minimum height is 26 inches, the ratio is approximately 42/26=1.62. However, these are only examples and not meant to be limiting.

Similarly, the seat assembly 16 is adjustable upward and downward along a vertical axis 72 to accommodate different size riders. In certain aspects, the seat assembly 16 includes a seat post 16*a* that is at an angle 74 relative to the vertical axis 72. As such, the seat assembly 16 is adjustable upward and downward along an oblique axis 76 relative to the vertical axis 72 to accommodate different size riders. In examples, the seat assembly 16 is translatable upward and downward along the vertical axis 72 or oblique axis 76 between zero inches and up to and including thirty-six inches. In some examples, the seat assembly 16 is translatable by at least a minimum distance. For example, the seat assembly 16 can be translatable by at least six inches. According to certain embodiments, the seat assembly 16 includes a locking mechanism 81 that locks the seat assembly 16 in place at a desired height. In examples, the angle 74 of the seat post 16*a* relative to the vertical axis 72 is greater than zero degrees and less than ninety degrees (e.g., the angle 74 may be 12 degrees, 16 degrees, 20 degrees, 24 degrees, 28 degrees, etc.). In certain aspects, the steering column 18*a* and the seat post 16*a* are at different angles 74 relative to the vertical axis 72.

Similarly, in some examples, the seat assembly 16 has a height 73 that includes a minimum and maximum height relative to the floor panel 46. For example, the height 73 of the seat assembly 16 relative to the floor panel 46 can include a minimum height of 30 inches relative to the floor panel 46 and a maximum height of 18 inches relative to the floor panel 46. In some embodiments, the maximum height and the minimum height of the seat assembly 16 can be determined by a ratio. For example, the ratio of the maximum height to the minimum height of the seat assembly 16 can be greater than or equal to 1.5. For example, in embodiments where the maximum height of the seat assembly 16 relative to the floor panel 46 is 30 inches and the minimum height is 18 inches, the ratio is approximately 30/18=1.66. In some embodiments, the ratio of the maximum height relative to the minimum height of the steering assembly 18 and the ratio of the maximum height relative to the minimum height of the seat assembly 16 can be substantially the same (e.g., +/−0.1). In other embodiments, the ratio of the maximum height to the minimum height of the steering assembly 18 can be greater than the ratio of the maximum height to the minimum height of the seat assembly 16. In even other embodiments, the ratio of the maximum height to the minimum height of the steering assembly 18 can be less than the ratio of the maximum height to the minimum height of the seat assembly 16. However, these are only examples and not meant to be limiting.

In certain aspects, the seat 17 is adjustable forward and backward along the x-axis 66 to accommodate different size riders and/or different positions. In certain examples, the seat 17 is translatable forward and backward along a track running parallel to the x-axis 66 by six inches, seven inches, eight inches, nine inches, ten inches, eleven inches, twelve inches, or more inches.

In at least some embodiments, the seat assembly 16 includes a hinge mechanism 16*b* that allows a user to tilt the seat 17 forward. In certain aspects, the hinge mechanism 16*b* allows the user to tilt the seat 17 forward so a top surface 17*b* of the seat 17 is parallel to a line 77 extending parallel the seat post 16*a*. By tilting the seat 17 forward as illustrated in FIG. 4B, a user has more space to move more freely while operating the convertible recreational vehicle 2. In addition, the seat 17 can be used by the rider to brace against while standing and operating the convertible recreational vehicle 2. In aspects, the seat 17 includes one or more hip bolsters 17*c* to help brace and/or stabilize a rider of the convertible recreational vehicle 2.

In certain instances, the convertible recreational vehicle 2 includes one or more tethers 78. The tether 78 can be coupled to a user (e.g., a user's wrist) and include one or more ends 78*a* that are attached to the convertible recreational vehicle 2, such as the handlebar 19. In these embodiments, if the user takes the user's hand off of the handlebar 19 (e.g., if the user falls off the convertible recreational vehicle 2), one or more ends 78*a* of the tether 78 decouple from the handlebar 19, which can initiate sending a brake signal to a controller 80. The controller 80 can relay the brake signal to a brake of the convertible recreational vehicle 2 to initiate a braking sequence. The braking sequence will slow and stop the convertible recreational vehicle 2 to prevent the convertible recreational vehicle 2 from running into another object, such as the user.

Figure 6:
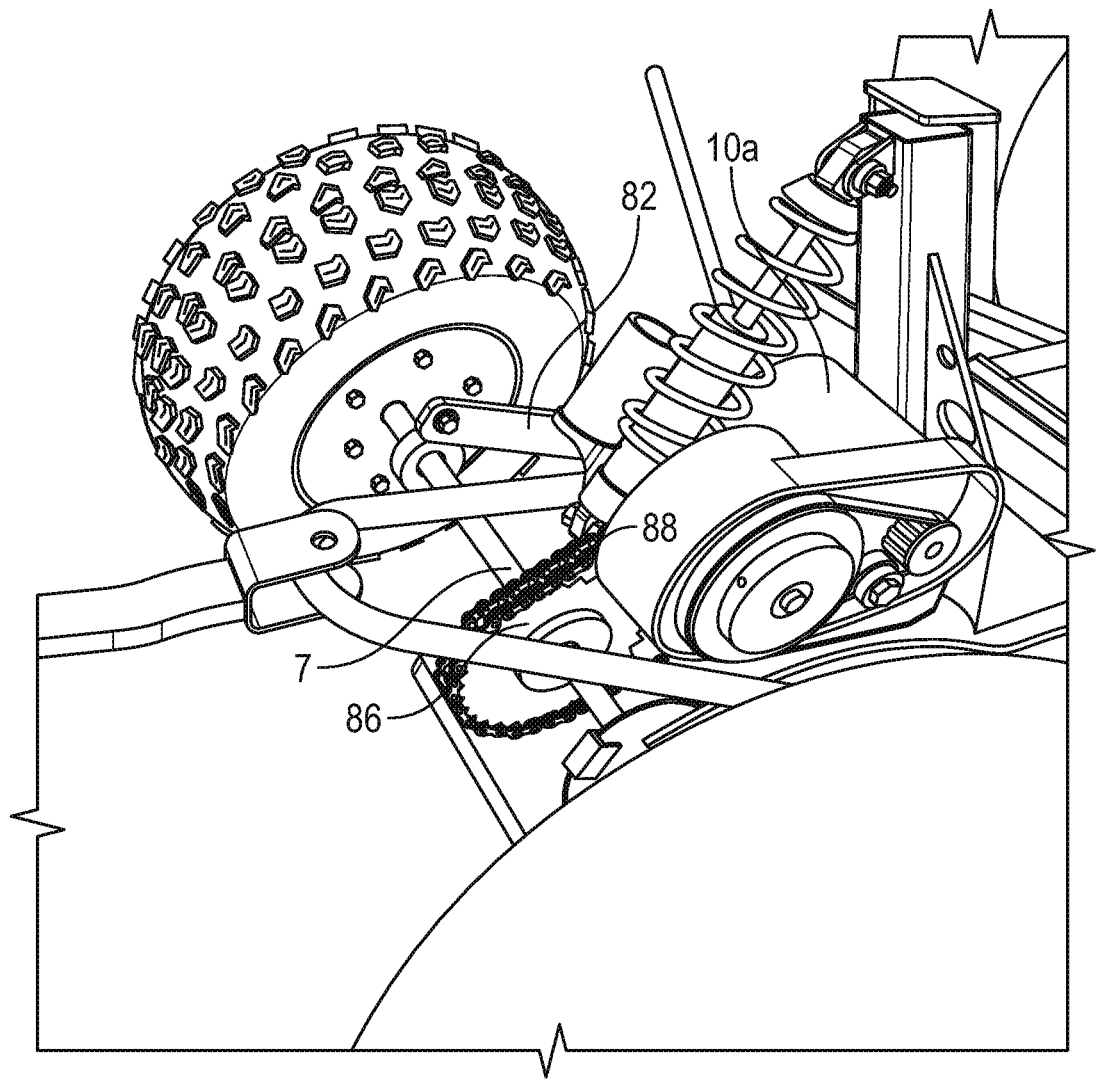
FIGS. 6, 7A, and 7B are perspective views of exemplary motors incorporated into the convertible recreational vehicle, in accordance with embodiments of the present disclosure.
Figure 7A:
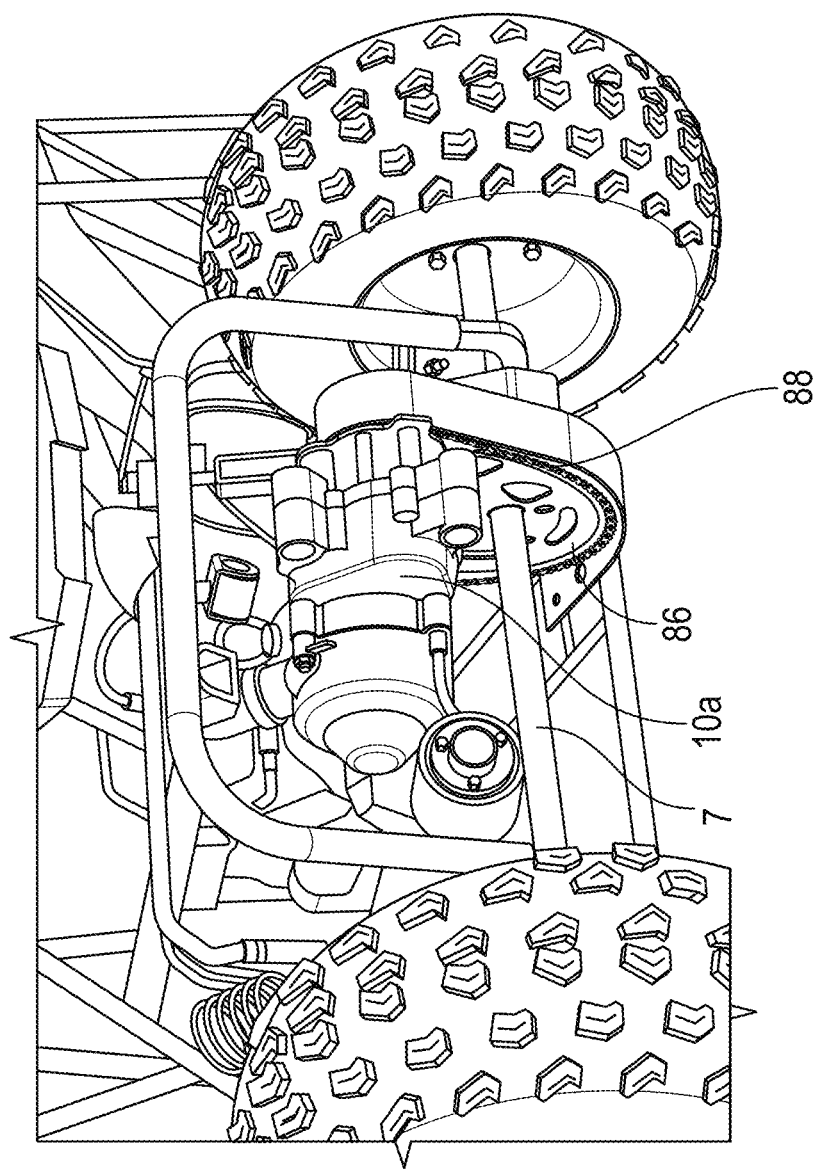
Figure 7B:
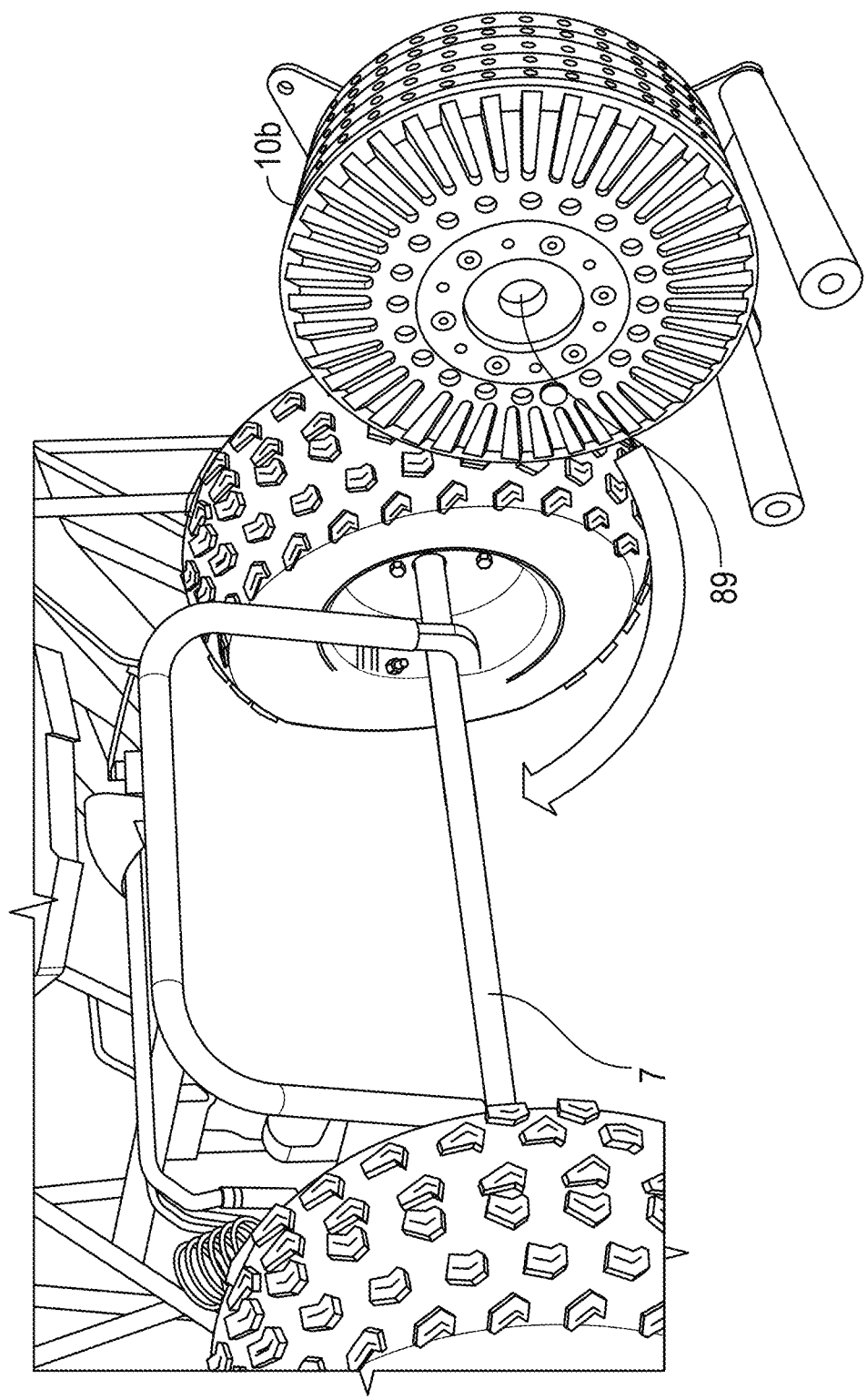

FIGS. 6, 7A, and 7B are perspective views of an exemplary motor 10 incorporated into the convertible recreational vehicle 2, in accordance with embodiments of the present disclosure. FIGS. 6, 7A, and 7B are merely examples, which should not unduly limit the scope of the claims. One of ordinary skill in the art would recognize many variations, alternatives, and modifications.

In some examples, the motor 10 may be mounted proximal the rear axle 7 on the rear swing arm 82 of the convertible recreational vehicle 2. By mounting the motor 10 on the rear swing arm 82, cost savings can be achieved over other mounting locations. In some aspects, the motor 10 does not cross over a centerline 59 of the floor panel 46. This allows the top surface 52 of the floor panel 46 to be more planar across a width 48 of the floor panel 46 so a user has more space to place the user's feet and/or does not have to step over a ridge, bump, etc. when getting on and off the convertible recreational vehicle 2. In some embodiments, the motor 10 does not extend past a distal portion 61*b* of the floor panel 46. In certain embodiments where the motor 10 is located in the front of the convertible recreational vehicle 2, the motor 10 does not extend past a proximal portion 61*a* of the floor panel 46. Similarly, these configurations allow the top surface 52 of the floor panel 46 to be more planar across a width 48 of the floor panel 46 so a user has more space to place the user's feet and/or does not have to step over a ridge, bump, etc. when getting on and off the convertible recreational vehicle 2.

In certain examples, the motor 10 is an internal combustion motor or an electric motor. In some instances, the motor 10 is a radial flux motor 10*a*. The radial flux motor 10*a* may be coupled to a sprocket 86 via a chain 88 or other coupling mechanism. The motor 10*a* drives rotation of the sprocket 86, which in turn drives the axle 7 to rotate the ground-engaging members 8 of the convertible recreational vehicle 2. Alternatively, motor 10 is an axial flux motor 10*b*. The axial flux motor 10*b* includes a conduit 89 through which the axle 7 is arranged. Axial flux motor 10*b* then directly drives the axle 7 without the need for the sprocket 86 and/or chain 88. Because the sprocket 86 and/or chain 88 is no longer needed when the motor 10 is an axial flux motor 10*b*, more space is available in the convertible recreational vehicle 2 for storing cargo in the rear storage area 26. In addition, the removal of the sprocket 86 and/or chain 88 eliminates the possibility of one or more of the components wearing down and/or breaking. Additionally, or alternatively, the motor 10 is a hub motor. In some of these instances, a center of the motor 10 is rigidly connected to the chassis (spindle) of the convertible recreational vehicle 2 and an outer rim of the motor 10 directly turns the ground engaging members 8. For comparison, according to certain embodiments, in instances where the motor 10 is an axial flux motor 10b, the axial flux motor 10b directly turns the axle 7, whereas in instances where the motor 10 is a hub motor 10, the motor 10 directly turns the ground engaging members 8.

Figure 8:
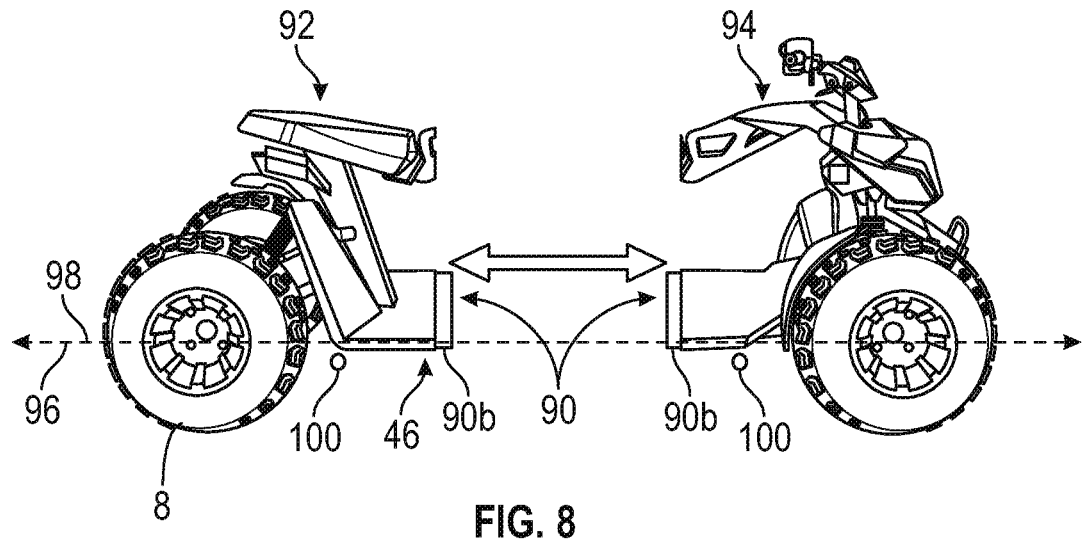
FIGS. 8-9 are side views of the convertible recreational vehicle illustrated in FIGS. 1-5, in accordance with embodiments of the present disclosure.
Figure 9:
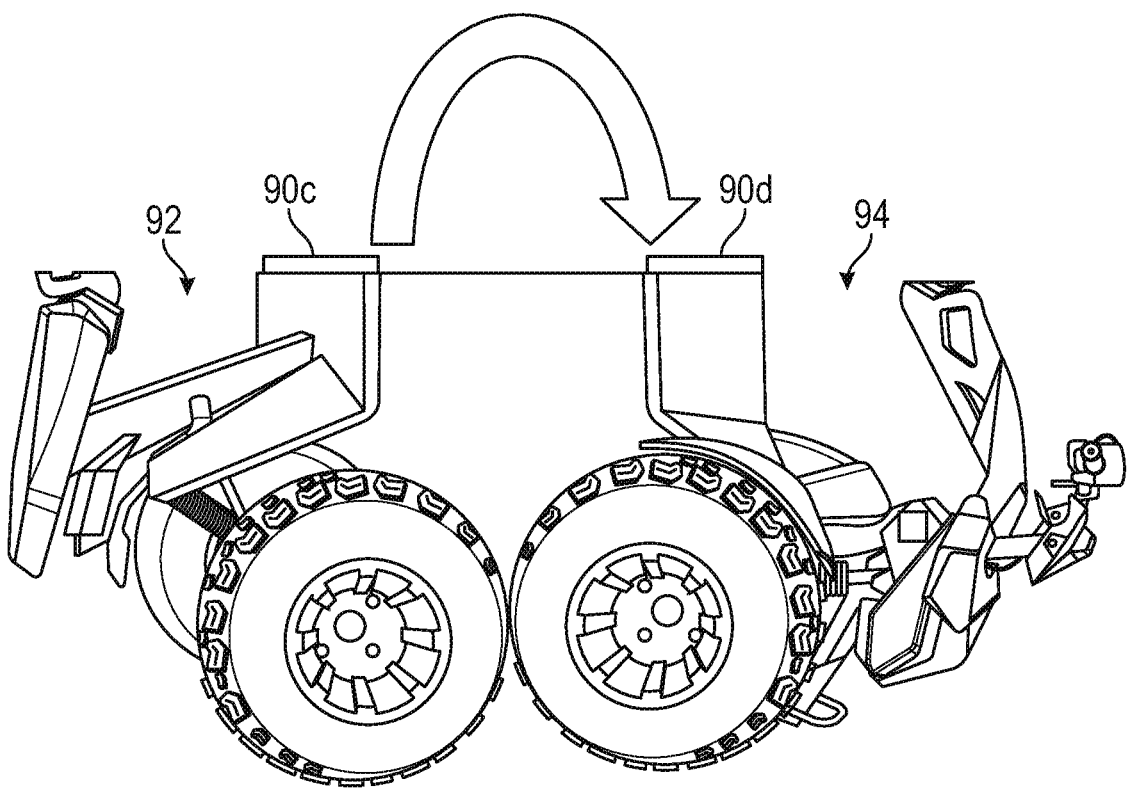

FIGS. 8-9 are side views of the convertible recreational vehicle 2 illustrated in FIGS. 1-5, in accordance with embodiments of the present disclosure. FIGS. 8 and 9 are merely examples, which should not unduly limit the scope of the claims. One of ordinary skill in the art would recognize many variations, alternatives, and modifications.

As illustrated, the floor panel 46 can include a coupling mechanism 90 that couples the back portion 92 of the convertible recreational vehicle 2 to the front portion 94 of the convertible recreational vehicle 2. These embodiments facilitate easier transport and/or storage of the convertible recreational vehicle 2. In aspects, the coupling mechanism 90 allows the front portion 94 to become detached from the back portion 92, as illustrated in FIG. 8. Additionally, or alternatively, the coupling mechanism 90 can include a joint that allows the back portion 92 to remain attached to the front portion 94, but the convertible recreational vehicle 2 can be folded at the coupling mechanism 90 juncture. Examples of a coupling mechanism include, but are not limited to a hinged joint, a pin fastener that extends through one or more portions of the floor panel 46, one or more clamps, etc.

Figure 10:
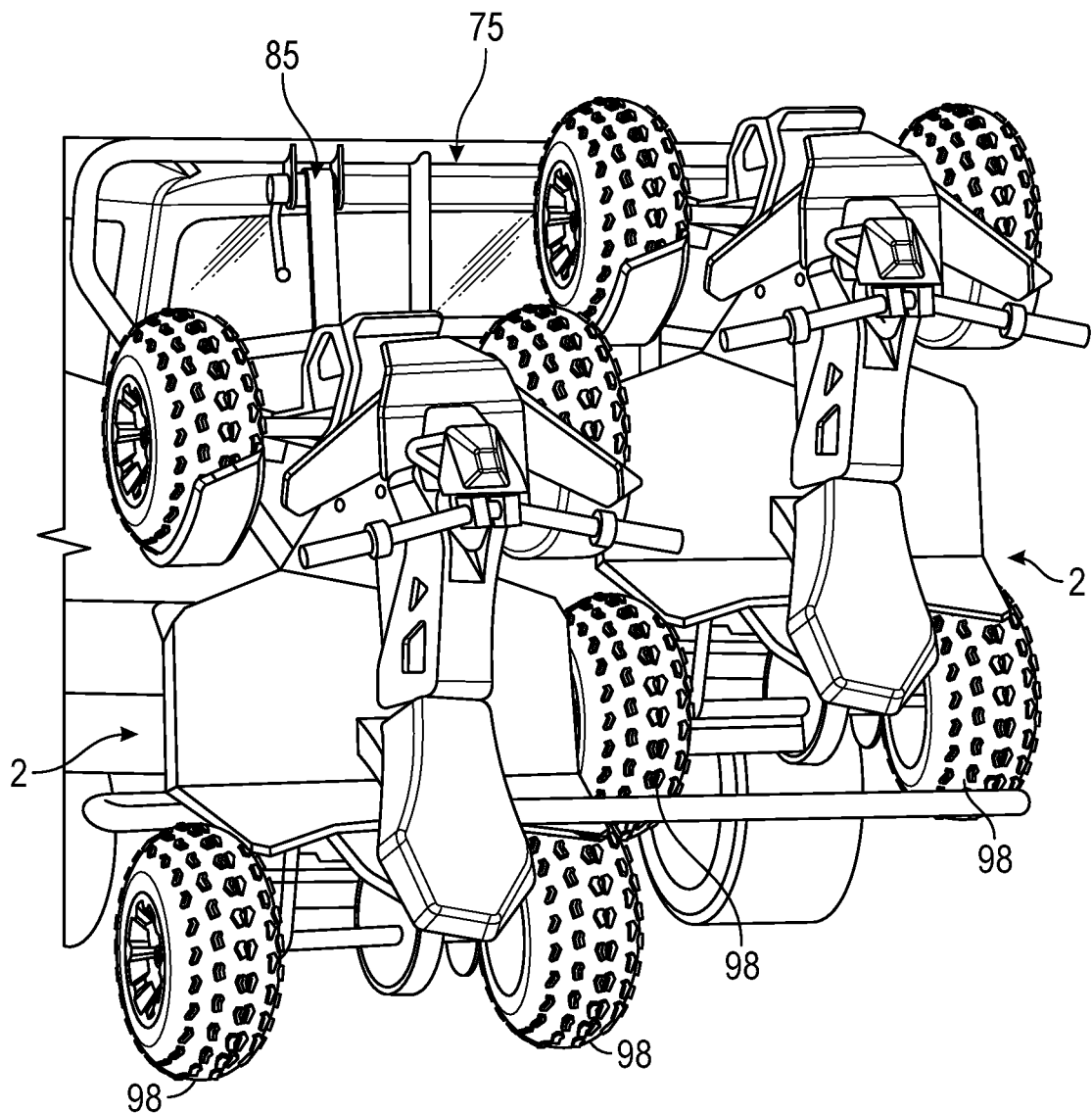
FIG. 10 is a view of the convertible recreational vehicle being trailered, in accordance with embodiments of the present disclosure.

In certain embodiments, the convertible recreational vehicle 2 can be weighted so that when the convertible recreational vehicle 2 is vertical, as illustrated in FIG. 10, a line 96 extending through the center of mass also passes through a point of contact 98 with the ground. As such, the convertible recreational vehicle 2 can be stored vertically unaided. Additionally, or alternatively, the convertible recreational vehicle 2 can include one or more pins 100. The pins 100 can be used to trailer the convertible recreational vehicle 2, as illustrated in FIG. 10. In aspects, the pins 100 can be located on a bottom surface of the floor panel 46 and/or coupled to a portion of the frame 4. Further, vehicle 2 may be configured to attach to a rack 75 on the back of an automobile. Illustratively, in FIG. 10, the rack 75 may receive ground engaging members 6, 8. In various embodiments, the rack 75 includes retention member 85 to couple vehicle 2 to the back of an automobile. Retention member 85 may be a strap, a hook, or other device configured to retain vehicle 2. In various embodiments, the rack 75 may hold a pair of vehicles 2, and the vehicles 2 are positioned vertically and laterally offset from each other. In various embodiments, the rack 75 may include a system configured to raise and lower vehicles 2 onto a platform or support surface of the rack 75 and may be coupled to the rack 75 when vehicles are completely raised onto the rack 75.

FIG. 11 is a perspective view of the convertible recreational vehicle 2 including an accessory 102, in accordance with embodiments of the present disclosure. FIG. 11 is merely an example, which should not unduly limit the scope of the claims. One of ordinary skill in the art would recognize many variations, alternatives, and modifications.

As stated above, the convertible recreational vehicle 2 includes a rear storage area 26. In the illustrated embodiment, an accessory 102 (i.e., a golf bag 102) is supported by the rear storage area 26. The rear storage area 26 can be supported by the rear swing arm 82 (shown in FIG. 6). In some examples, the convertible recreational vehicle 2 can include one or more tie-downs 104 to help secure the accessory 102 to the convertible recreational vehicle 2. Additionally, or alternatively, a hitch can be coupled to the rear swing arm 82 for light-duty towing. In some examples, the hitch can be coupled to the rear swing arm 82 via a pin attachment.

Figure 12:
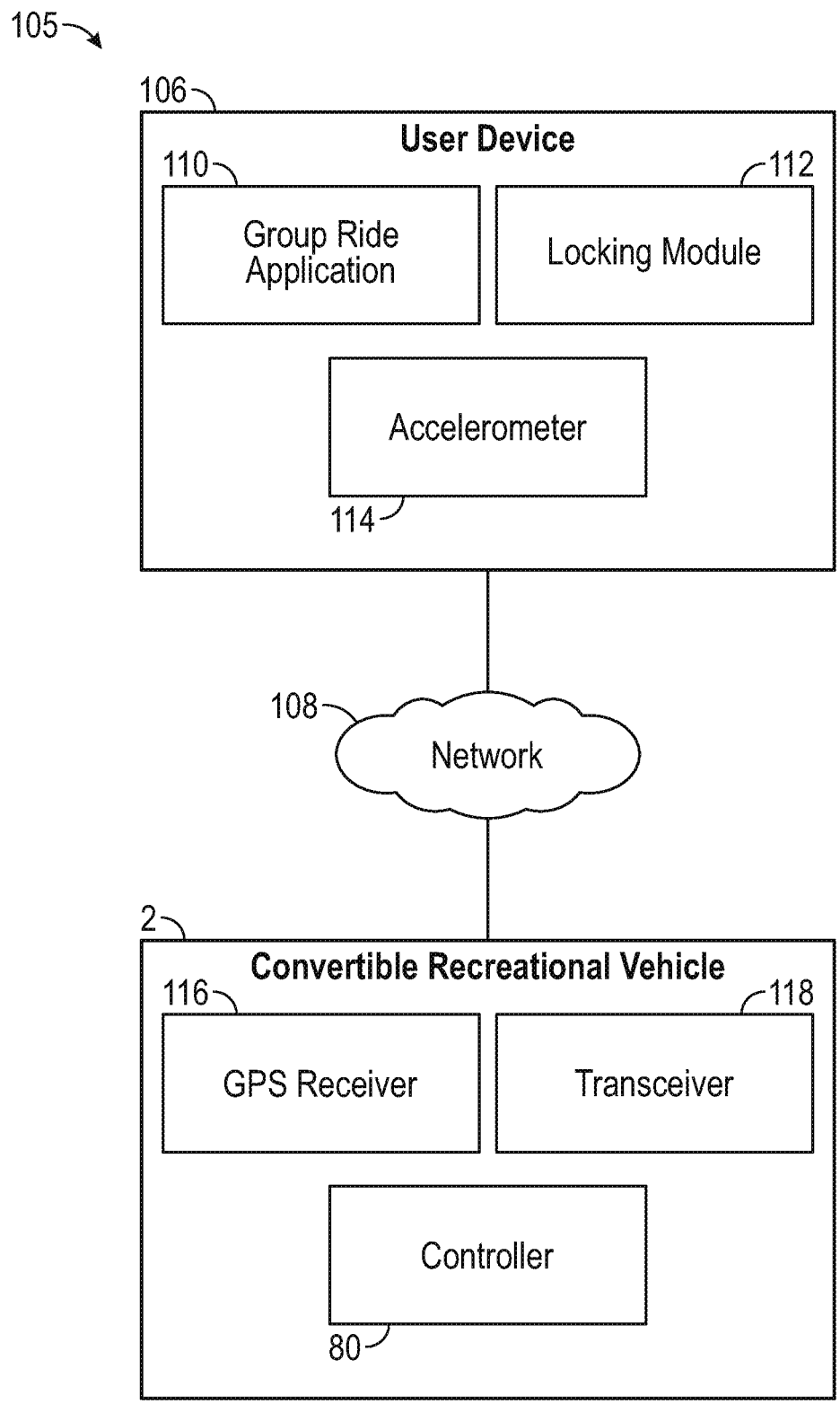
FIG. 12 is a block diagram of a system including a user device communicatively coupled to a convertible recreational vehicle, in accordance with embodiments of the present disclosure.

In some embodiments, a user device 106 can be communicatively coupled to one or more convertible recreational vehicles 2. FIG. 12 is a block diagram of a system 105 including a user device 106 communicatively coupled to a convertible recreational vehicle, in accordance with embodiments of the present disclosure. FIG. 12 is merely an example, which should not unduly limit the scope of the claims. One of ordinary skill in the art would recognize many variations, alternatives, and modifications.

It will be appreciated that while system 105 is illustrated as comprising one user device 106, any number of such elements may be used in other examples. Further, the functionality described herein with respect to the user device 106 may be distributed among or otherwise implemented on any number of different computing devices in any of a variety of other configurations in other examples. The user device 106 may each be any of a variety of computing devices, including, but not limited to, a mobile computing device, a laptop computing device, a tablet computing device, or a desktop computing device. The network 108 can be a local area network, a wireless network, or the Internet, or any combination thereof, among other examples.

As illustrated, the system 105 includes a user device 106 communicatively coupled to a convertible recreational vehicle 2 via a network 108. In aspects, the convertible recreational vehicle 2 includes a global positioning satellite (GPS) signal receiver 116 that is configured to receive GPS signals from various satellites. Based on triangulating the signals received from various satellites, the position of the convertible recreational vehicle 2 can be determined by the controller 80. In aspects, the controller 80 can transmit, via the transceiver 118, the position of the convertible recreational vehicle 2 to the user device 106. Additionally, or alternatively, the convertible recreational vehicle 2 can receive signals (e.g., instructions) from the user device 106 via the transceiver 118, as explained in more detail below.

In aspects, the user device 106 is able to control various aspects of the convertible recreational vehicle 2, as described below. To do so, in certain instances, the convertible recreational vehicle 2 includes a group ride application 110, a locking module 112, and/or an accelerometer 114.

Figure 13:
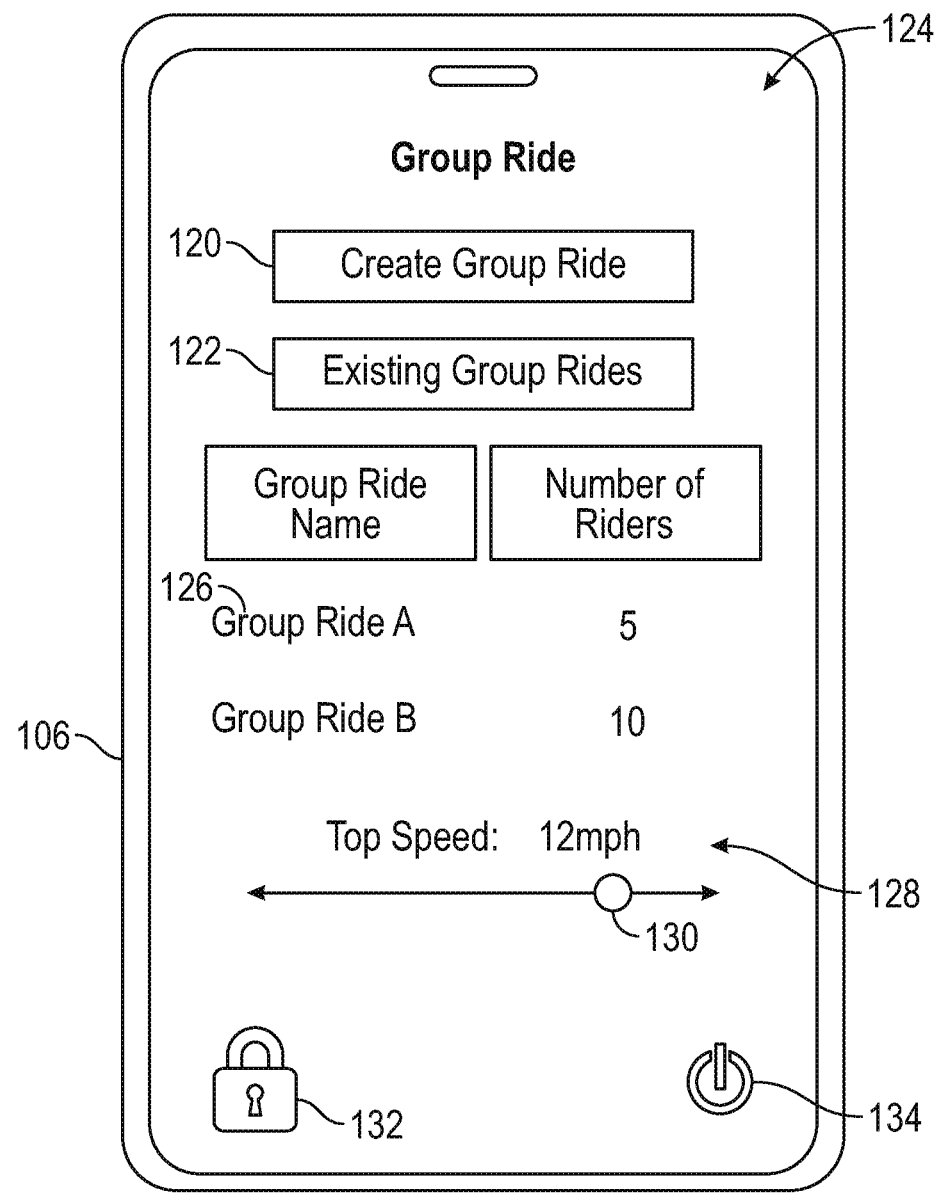
FIG. 13 is a diagram of an example user interface of a user device that can be used with the convertible recreational vehicle, in accordance with embodiments of the present disclosure.

According to certain embodiments, the group ride application 110 allows users of multiple convertible recreational vehicles 2 to join a group ride by creating a group ride 120 and/or selecting an existing group ride 122 on a user interface 124 of the user device 106, as illustrated in FIG. 13. In certain aspects, each group ride 126 can have different parameters, such as max speed 128, which can be set by sliding an indicator 130 to the left to decrease the max speed 128 or to the right to increase the max speed 128 of the group ride 126. In examples, each group ride 126 includes a group leader that can set the max speed 128 via the indicator 130.

Additionally, or alternatively, each group ride 126 can be set by the speed at which the group leader is currently riding. For example, when a group ride 126 is formed, a rider in the group can be assigned as the leader of the group ride 126. Then, as the riders are riding in the group ride 126, the user device 106 of the group leader can transmit a speed signal corresponding to the speed at which the group leader is riding to each transceiver 118 incorporated into each convertible recreational vehicle 2 in the group ride 126. The transceiver 118 then relays the speed signal to the controller 80 of each convertible recreational vehicle 2 in the group ride 126, which can send a signal to the throttle 21 limiting how fast a rider in the group ride 126 can go. In aspects, other riders in the group ride 126 can go as fast but not faster than the group leader is riding at any given time. Alternatively, other riders in the group ride 126 are able to go incrementally faster than the group leader at any given time. For example, other riders in the group may be able to ride 1 mph, 2 mph, etc. faster than the group leader, enabling another rider in the group ride 126 to catch up to the group leader if the other group rider has fallen behind.

In aspects, the group rider application 110 may also be able to send fall notifications to riders in a group ride 126. For example, the user device 106 and/or the convertible recreational vehicle 2 can include an accelerometer 114 that is able to sense a sudden acceleration that may be indicative of a fall. In these instances, the user device 106 can send a fall signal to other user devices 106 and/or to the convertible recreational vehicle 2 that a rider has potentially fallen, alerting other riders in a group ride 126 of the potential fall.

As illustrated, the user device 106 includes a locking module 112. In aspects, the locking module 112 allows a user, via the user interface 124 of the user device 106, to lock or unlock the lock 27 of the storage area 24, according to certain embodiments. For example, the user interface 124 can include a lock symbol 132 indicating whether the storage area 24 is locked or unlocked. That is, for example, when the lock symbol 132 is shown as being locked as illustrated in FIG. 13, the storage area 24 is locked. Conversely, when the lock symbol 132 is shown as being unlocked, the storage area 24 is unlocked. In certain embodiments, the user can touch the lock symbol 132 to lock or unlock the storage area 24. For example, in response to a user touching the lock symbol 132, the user device 106 sends a signal to the transceiver 118 to unlock the storage area 24. The transceiver 118 then relays the signal to the controller 80, which can send a signal to the lock 27 to unlock. In certain aspects, the controller 80 sends a confirmation signal to the transceiver 118 to confirm the lock 27 has been unlocked. The transceiver 118 can relay the confirmation signal to the user device 106 as confirmation the lock 27 has been unlocked. Conversely, if the storage area 24 is unlocked, a user can touch the lock symbol 132 to lock the storage area 24. The transceiver 118 then relays the signal to the controller 80, which can send a signal to the lock 27 to lock. In certain aspects, the controller 80 sends a confirmation signal to the transceiver 118 to confirm the lock 27 has been locked. The transceiver 118 can relay the confirmation signal to the user device 106 as confirmation the lock 27 has been locked.

In aspects, the user interface 124 includes a power symbol 134 to start and shut down the convertible recreational vehicle 2. For example, when the power symbol 134 is shown having a first characteristic (e.g., being illuminated in a first color such as red), the convertible recreational vehicle 2 is off. Conversely, when the power symbol 134 is shown as having a second characteristic (e.g., being illuminated in a second color such as blue), the convertible recreational vehicle 2 is on.

In certain embodiments, the user can touch the power symbol 134 to turn on and off the convertible recreational vehicle 2. For example, in instances where the power symbol 134 indicates the convertible recreational vehicle 2 is on, a user can touch the power symbol 134. In response, the user device 106 sends a signal to the transceiver 118 to turn off the convertible recreational vehicle 2. The transceiver 118 then relays the signal to the controller 80, which can send a signal to the motor 10 to turn off. In certain aspects, the controller 80 sends a confirmation signal to the transceiver 118 to confirm the convertible recreational vehicle 2 is off. The transceiver 118 can relay the confirmation signal to the user device 106 as confirmation that the convertible recreational vehicle 2 is off.

Conversely, in instances where the power symbol 134 indicates the convertible recreational vehicle 2 is off, a user can touch the power symbol 134. In response, the user device 106 sends a signal to the transceiver 118 to turn on the convertible recreational vehicle 2. The transceiver 118 then relays the signal to the controller 80, which can send a signal to a starter to start the motor 10. In certain aspects, the controller 80 sends a confirmation signal to the transceiver 118 to confirm the convertible recreational vehicle 2 is turned on. The transceiver 118 can relay the confirmation signal to the user device 106 as confirmation the operation of the convertible recreational vehicle 2 is on.

Figure 14:
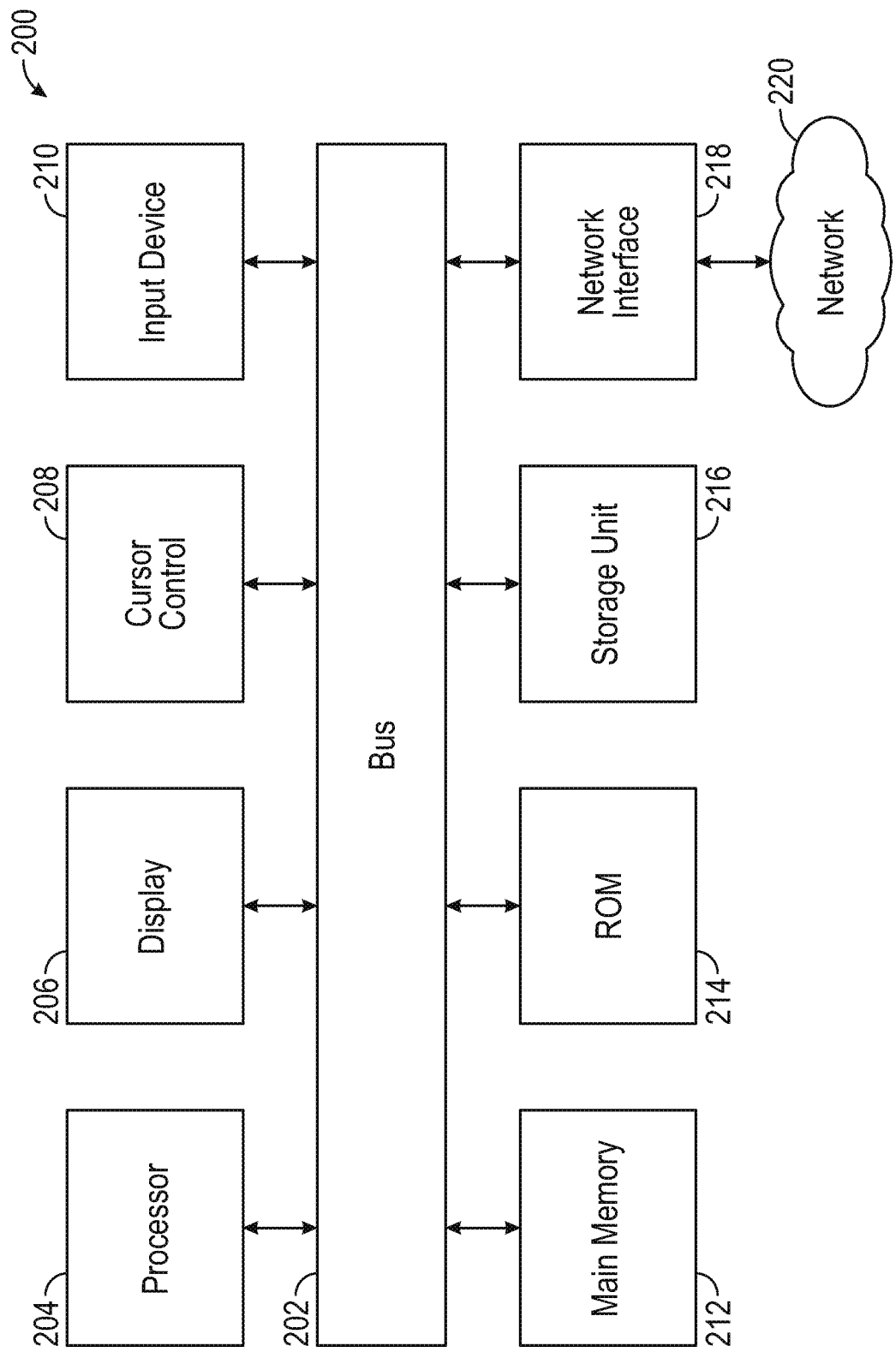
FIG. 14 is a block diagram of an exemplary computer architecture, in accordance with embodiments of the present disclosure.

FIG. 14 illustrates a diagram of a computing system 200 for implementing the system 105, controller 80, and/or user device 106, accordance with certain embodiments of the present disclosure. For example, some or all of the functions of the user device 106 (e.g., group ride application 110 and/or locking module 112) may be performed by a computing system that has similar components as the computing system 200. This diagram is merely an example, which should not unduly limit the scope of the claims. One of ordinary skill in the art would recognize many variations, alternatives, and modifications.

The computing system 200 includes a bus 202 or other communication mechanism for communicating information between, a processor 204, a display 206, a cursor control component 208, an input device 210, a main memory 212, a read only memory (ROM) 214, a storage unit 216, and/or a network interface 218. In some examples, the bus 202 is coupled to the processor 204, the display 206, the cursor control component 208, the input device 210, the main memory 212, the read only memory (ROM) 214, the storage unit 216, and/or the network interface 218. And, in certain examples, the network interface 218 is coupled to a network 220 (e.g., the network 108).

In some examples, the processor 204 includes one or more general purpose microprocessors. In some examples, the main memory 212 (e.g., random access memory (RAM), cache and/or other dynamic storage devices) is configured to store information and instructions to be executed by the processor 204. In certain examples, the main memory 212 is configured to store temporary variables or other intermediate information during execution of instructions to be executed by processor 204. For example, the instructions, when stored in the storage unit 216 accessible to processor 204, render the computing system 200 into a special-purpose machine that is customized to perform the operations specified in the instructions (e.g., the components 110-112). In some examples, the ROM 214 is configured to store static information and instructions for the processor 204. In certain examples, the storage unit 216 (e.g., a magnetic disk, optical disk, or flash drive) is configured to store information and instructions.

Thus, computing system 200 may include at least some form of computer readable media. The computer readable media may be any available media that can be accessed by processor 204 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some embodiments, the display 206 (e.g., a cathode ray tube (CRT), an LCD display, or a touch screen) is configured to display information to a user of the computing system 200. In some examples, the input device 210 (e.g., alphanumeric and other keys) is configured to communicate information and commands to the processor 204. For example, the cursor control 208 (e.g., a mouse, a trackball, or cursor direction keys) is configured to communicate additional information and commands (e.g., to control cursor movements on the display 206) to the processor 604.

Referring now to FIGS. 15-24, a vehicle 1002 will be described. Vehicle 1002 may include components, systems, or other technology which, for the intent of this disclosure, are compatible with vehicle 2. Similarly, the hereinbefore disclosure pertaining to vehicle 2 should be considered generally compatible with vehicle 1002.

Figure 15:
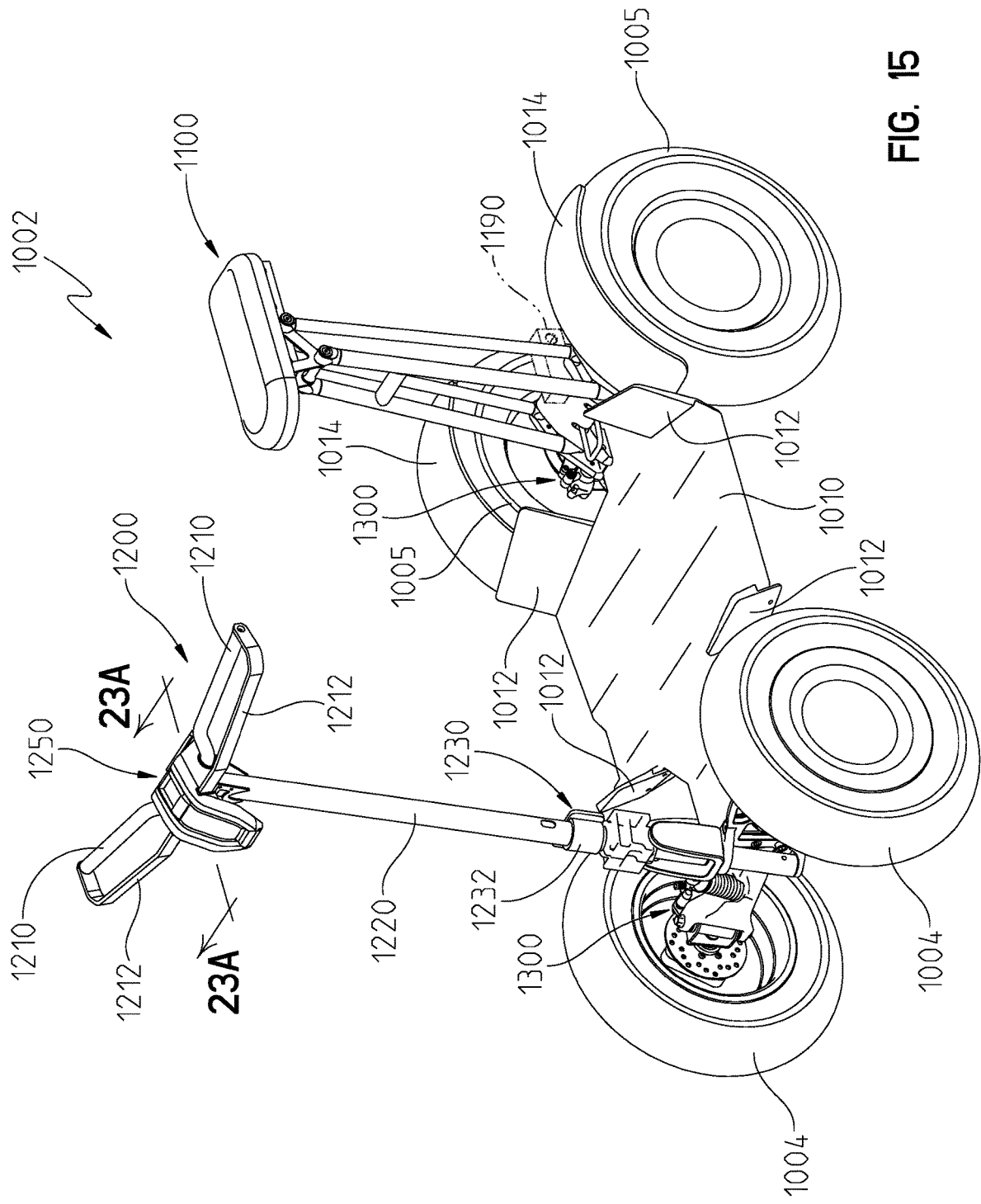
FIG. 15 is a front perspective view of an example vehicle of the present disclosure.
Figure 16:
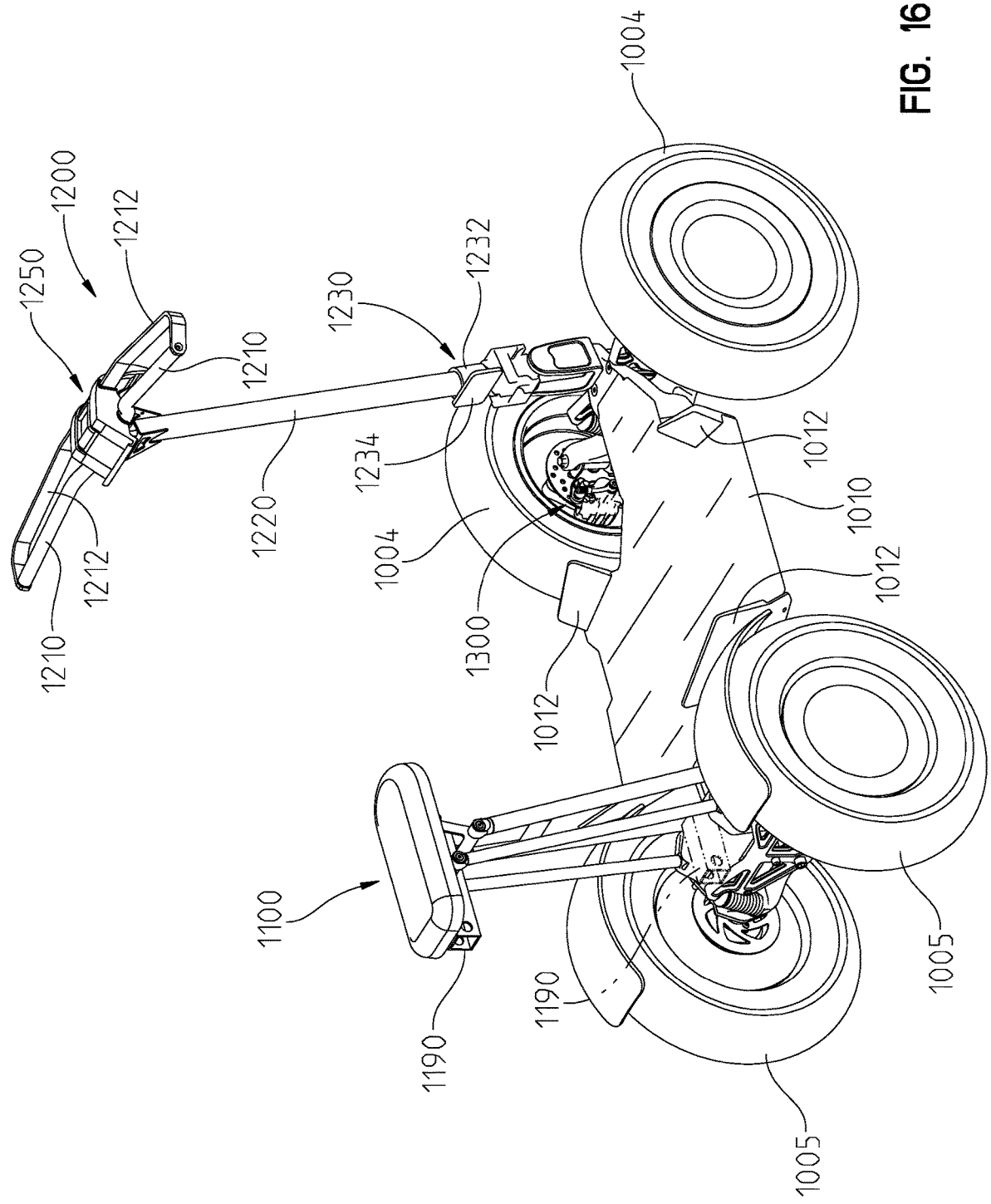
FIG. 16 is a rear perspective view of the vehicle of FIG. 15.
Figure 17:
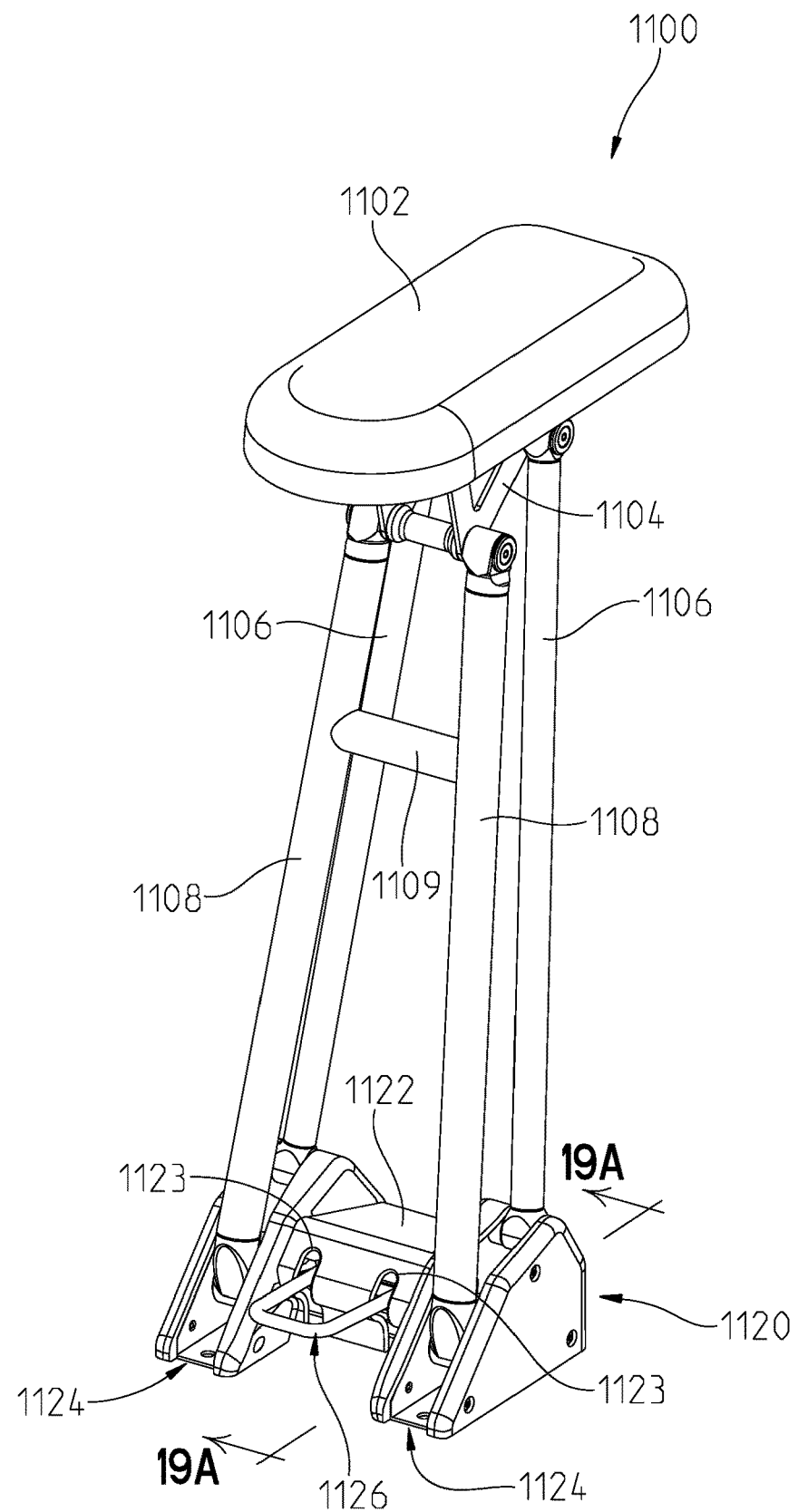
FIG. 17 is a perspective view of the seating assembly of the vehicle of FIG. 15.
Figure 18:
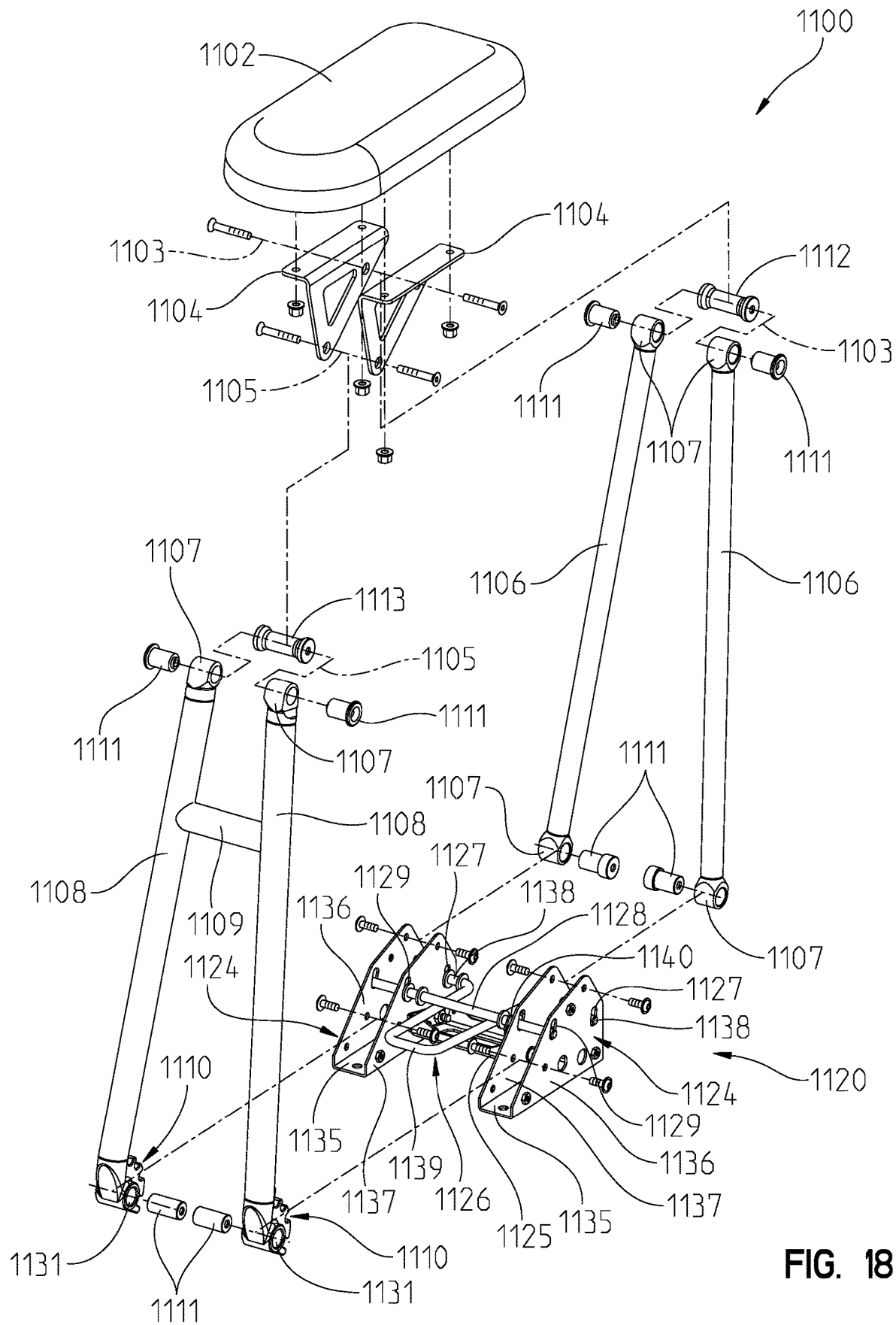
FIG. 18 is an exploded perspective view of the seating assembly of the vehicle of FIG. 15.

Now referring to FIGS. 15-16, vehicle 1002 includes a plurality of front ground engaging members 1004, and a plurality of rear ground engaging members 1005. Ground engaging members 1004, 1005 may be wheels, tracks, skis, or other suitable members. Ground engaging members 1004, 1005 support an operator platform 1010 defining an operator area which is wide enough for an operator to stand with two feet at least shoulder width apart. Operator platform 1010 may include flaps 1012 which inhibit debris (e.g., water, mud) from entering the operator area. Illustratively, flaps 1012 are coupled to operator platform 1010 at each corner of platform 1010. Each flap 1012 is generally positioned proximate one of the ground engaging members 1004, 1005. Additionally, vehicle 1002 may include a plurality of wheel guards 1014 configured to cover a proportion of each of the ground engaging members 1004, 1005. That is, a wheel guard 1014 may be positioned above ground-engaging members 1004, 1005 such that wheel guard 1014 covers a top of ground engaging member 1004, 1005. In various embodiments, each ground engaging member 1004, 1005 includes a wheel guard 1014. In various embodiments, only rear ground engaging members 1005 include a wheel guard 1014. In various embodiments, only front ground engaging members 1004 include a wheel guard 1014. Vehicle 1002 further includes a brake system 1300, and front ground engaging members 1004 may include a set of brakes and/or rear ground engaging members 1005 may include a set of brakes.

Vehicle 1002 further includes a steering assembly 1200 located generally between front ground engaging members 1004. Steering assembly 1200 includes a center console 1250 at an upper extent of a steering shaft 1220 and a pair of handlebars 1210 extending laterally outward in either direction from center console 1250. That is, one handlebar 1210 extends laterally to the left from center console 1250 to be grasped by a user's left hand and one handlebar 1210 extends laterally to the right from center console 1250 to be grasped by a user's right hand. Handlebars 1210 also include hand guards 1212 to protect a user's hands from debris. Illustratively, hand guards 1212 may be coupled to a lateral outer edge of handlebar 1210 and extend around a front of handlebars 1210 to couple with center console 1250. In various embodiments, handlebar 1210 and hand guard 1212 may be constructed of a singular piece. In various embodiments, hand guard 1212 may be coupled to handlebar 1210 at its lateral outer extent by a fastener, adhesive, or other joining method/mechanism.

Steering assembly 1200 further includes a steering shaft 1220 operably coupled to the handlebars 1210. That is, a user grasping handlebars 1210 may rotate steering shaft 1220 by rotating handlebars 1210. Steering shaft 1220 extends downward to couple with other components of steering assembly 1200 configured to steer front ground engaging members 1004, such as a rack and pinion system, a pitman arm system or other type of steering system. Steering shaft 1220 is also movable vertically along its longitudinal axis to either shorten or lengthen the height of the steering shaft.

In the present embodiment, the steering shaft may be adjusted using an adjustment mechanism 1230. Adjustment mechanism comprises a collar 1232 and a handle 1234. In various embodiments, collar 1232 surrounds steering shaft 1220 and is movable between a compressed and decompressed position and the effective diameter of collar 1232 is changeable. Collar 1232 may be a compress shaft collar or may further be a set screw shaft collar. Handle 1234 is rotatable between a locked position and an unlocked position. When steering assembly 1200 is positioned so that ground engaging members 1004 or 1005 are pointed straight ahead, and handle 1234 is in a locked position, handle 1234 extends in a generally lateral direction, and when handle 1234 is in an unlocked position, handle 1234 extends in a generally longitudinal direction. When handle 1234 is in the unlocked position, collar 1232 is positioned in the uncompressed position, and shaft 1220 can move vertically within collar 1232. When handle 1234 is rotated from the locked position to the unlocked position, collar 1232 is moved between the compressed position and the uncompressed position, and when handle 1234 is rotated from the unlocked position to the locked position, collar 1232 is moved between the uncompressed position and the compressed position. Handle 1234 may have a cammed interface with collar 1232. As handle 1234 is rotated from the unlocked position to the locked position, the cammed interface may push or pull collar 1232 closer together, so that the effective diameter is reduced. Further, as handle 1234 is rotated from the locked position to the unlocked position, the cammed interface may relieve the pressure on collar 1232 so that the effective diameter is increased, allowing steering shaft 1220 to move through collar 1232.

Referring to FIGS. 15-19C, vehicle 1002 further includes a seating assembly 1100 located generally between rear ground engaging members 1005. Seating assembly 1100 includes a seat 1102 supported by one or more seat frame(s) 1104 disposed underneath seat 1102. Seat frame 1104 is illustratively shown as a pair of seat frames 1104 which are laterally spaced apart from each other. Seat frames 1104 are generally triangularly shaped and separated by a rear spacer 1112 and a front spacer 1113. Illustratively, rear spacer 1112 is positioned along a first seat rotation axis 1103 and front spacer 1113 is positioned along a second seat rotation axis 1105. Generally, the second seat rotation axis 1105 is vertically lower than, and forward of, the first seat rotation axis 1103. Seating assembly 1100 further includes a pair of rear upstanding frame members 1106 and a pair of front upstanding frame members 1108. Each rear upstanding frame member 1106 has a sleeve 1107 positioned at its upper extent and is rotatably coupled to a corresponding seat frame 1104 at sleeve 1107 along first seat rotation axis 1103. Each front upstanding frame member 1108 has a sleeve 1107 positioned at its upper extent and is rotatably coupled to seat frame 1104 at sleeve 1107 along second seat rotation axis 1105. Each sleeve 1107 has an opening extending generally transverse of vehicle 1002 and the opening is configured to receive a bushing 1111. When bushings 1111 are received within the sleeves 1107 of both rear upstanding frame members 1106, the bushings 1111, the openings of sleeves 1107, and the rear spacer 1112 are aligned along first seat rotation axis 1103. When bushings 1111 are received within the sleeves 1107 of both front upstanding frame members 1108, the bushings 1111, the openings of sleeves 1107, and the front spacer 1113 are aligned along second seat rotation axis 1105.

Front upstanding frame members 1108 further include a cross member 1109 positioned vertically intermediate their lower extent and their upper extent, coupled between front upstanding frame members 1108. Further, front upstanding frame members 1108 each include a geared end 1110 positioned at their lower extent. In the present embodiment, the geared end 1110 includes a plurality of teeth 1132, and a plurality of roots 1110A, 1110B, 1110C, 1110D between the teeth, extending in an arc approximately 135 degrees in length surrounding sleeve 1131. In various embodiments, the geared end may comprise a greater number of teeth 1132, a greater arc length of teeth 1132, less number of teeth 1132, or a shorter arc length of teeth 1132. Geared end 1110 receives bushings 1111 within sleeve 1131.

Each rear upstanding frame member 1106 also includes a sleeve 1107 positioned at its lower extent. Sleeve 1107 also includes an opening transverse vehicle 1002, and a bushing 1111 is received within the opening of sleeve 1107. Sleeves 1107 may be affixed to either end of rear upstanding frame member 1106 and on an upper extent of front upstanding frame member 1108 through a weld, a thread, an adhesive, a fastener, friction fit, pin, or other affixing method/mechanisms.

Seating system 1100 further comprises seating adjustment assembly 1120. Seating adjustment assembly 1120 includes a pair of U-shaped brackets 1124, and each U-shaped bracket 1124 includes a channel 1135 extending between an outer wall 1136 and an inner wall 1137. The U-shaped brackets 1124 are coupled to, and separated by, a coupling bracket 1125, which extends between inner walls 1137. Coupling bracket 1125 may be coupled to inner walls 1137 using fasteners, welds, adhesives, or other coupling methods/mechanisms. Each bracket 1124 comprises rear channels 1127 and forward channels 1129 within each outer wall 1136 and inner wall 1137. When U-shaped brackets 1124 are properly coupled to coupling bracket 1125, all rear channels 1127 are laterally aligned, and all forward channels 1129 are laterally aligned.

Each bracket 1124 receives one of the rear upstanding frame members 1106 within channel 1135, and the sleeve 1107 and/or bushing 1111 extends between outer wall 1136 and inner wall 1137. Illustratively, rear upstanding frame members 1106 are rotatably coupled to brackets 1124 about third seat rotation axis 1133. Each bracket 1124 also receives one of the front upstanding frame members 1108 within channel 1135, and the bushing 1111 and/or sleeve 113 extends between outer wall 1136 and inner wall 1137. Illustratively, front upstanding frame members 1108 are rotatably coupled to brackets 1124 along fourth seat rotation axis 1145.

Seating system 1100 also includes lever 1126 and rod 1128. Rod 1128 extends between and within the entirety of forward channels 1129. Illustratively, rod 1128 is configured to move vertically within channels 1129. Lever 1126 is generally U-shaped and includes a pair of ends 1138 and a handle 1139, and each end 1138 extends through rear channels 1127 and the handle extends forwardly and vertically below and forward of rod 1128. A spring 1140 is coupled to, and extends between, the rod 1128 and the coupling bracket 1125. Spring 1140 biases rod 1128 and coupling bracket 1125 together; that is, rod 1128 is biased downwardly to be positioned at the vertically lowest point of forward channel 1129.

In the present embodiment, a user may provide an upward force to handle 1139 and raise lever 1126, which in turn raises rod 1128. In the present embodiment, when no user force is placed on handle 1139, rod 1128 rests across the top of handle 1139. In various embodiments, rod 1128 may be placed adjacent, but not in contact with, the top of handle 1139. When no user force is placed on handle 1139, both handle 1139 and rod 1128 are positioned at a lowermost position of rearward channel 1127 and forward channel 1129, respectively, and are positioned in a locked position. When a sufficient force is used to raise handle 1139, and rod 1128 is raised to be in an uppermost position of forward channel 1129, both handle 1139 and rod 1128 are in an unlocked position. Seating adjustment assembly 1120 further comprises a cover 1122 configured to conceal the components described herein, except for handle 1139. Illustratively, cover 1122 includes slots 1123 configured to receive handle 1139 and are sized to allow handle 1139 to vertically move within cover 1122.

Figure 19C:
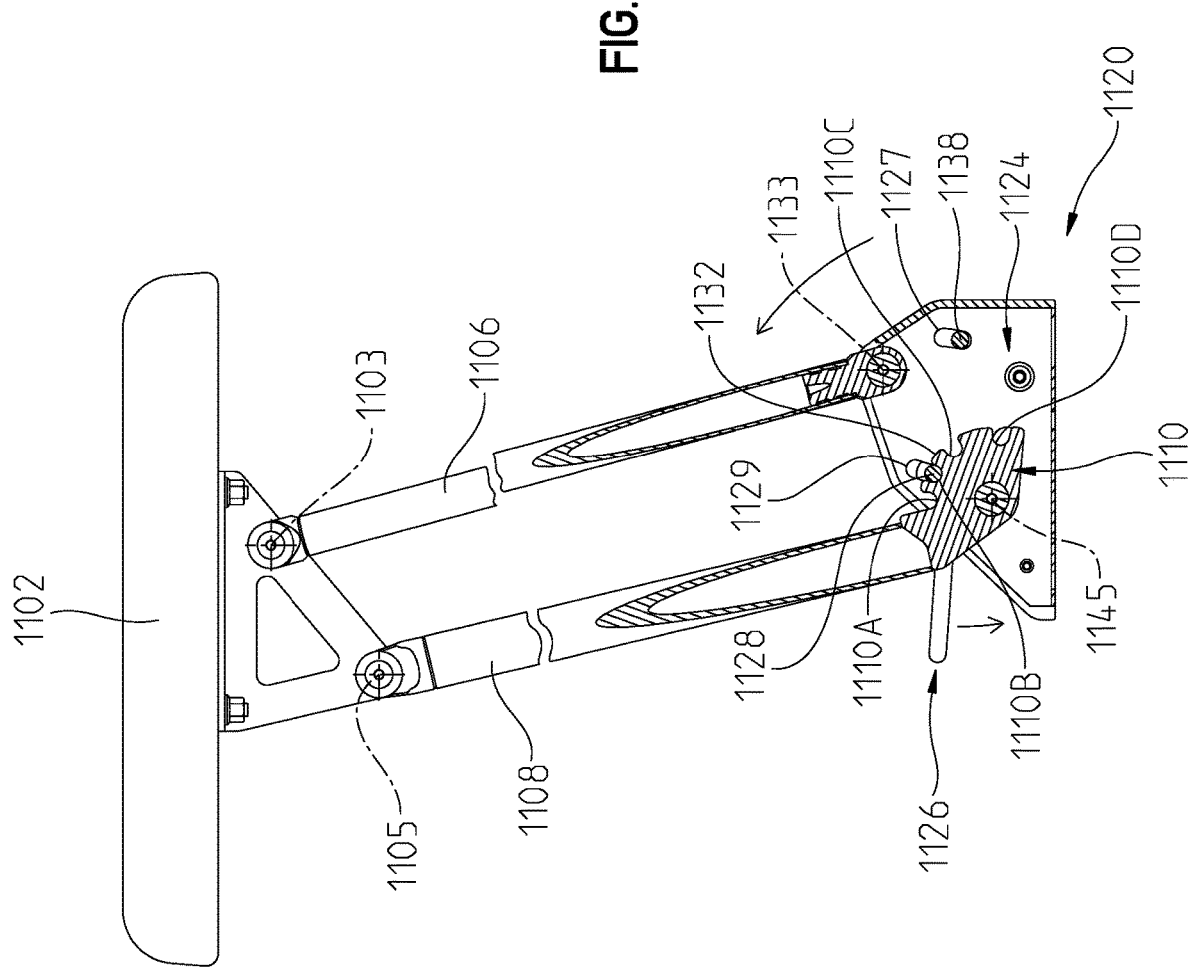
FIG. 19C is a cross-section view of the seating assembly of the vehicle of FIG. 15 in a locked, lowered position, taken along section line 19-19 of FIG. 17.

Referring now to FIGS. 19A-19C, the adjustment of seat 1102 using seating adjustment assembly 1120 will be explained in greater detail. As shown in FIG. 19A, seating assembly 1100 is shown in a locked position. Illustratively, lever 1126 and rod 1128 are shown in a locked position, and rod 1128 is received within root 1110A. When rod 1128 is in the locked position, it is received by any of roots 1110A, 1110B, 1110C, 1110D of geared end 1110. Rod 1128 is biased into engagement with geared end 1110 due to the biasing effect of spring 1140. Further, when rod 1128 is received within any of roots 1110A, 1110B, 1110C, 1110D, geared end 1110 is prohibited from rotating about channel 1135.

Now referring to FIG. 19B, seating assembly 1100 is shown in an unlocked position. That is, lever 1126 is raised upwardly and rod 1128 is raised as lever 1126 is raised. Illustratively, rod 1128 is raised out of engagement with geared end 1110 and is adjacent an upper extent of forward channels 1129. When rod 1128 is no longer in engagement with geared end 1110, geared end 1110 is able to rotate about channel 1135. As geared end 1110 rotates about channel 1135, seating assembly 1100 is moved downwardly and forwardly.

As shown in FIG. 19C, geared end 1110 is rotated forwardly from the position in FIG. 19A. Further, rod 1128 is shown engaged with root 1110B, therefore not allowing geared end 1110 to rotate further. Rod 1128 engages with root 1110B by a user reducing the force on lever 1126 and allowing rod 1128 to be biased downwardly through forward channels 1129 by spring 1140 and into engagement with root 1110B. Illustratively, geared end 1110 could be rotated such that rod 1128 is in engagement with any of roots 1110A, 1110B, 1110C, 1110D, so that a variety of discrete positions of seat 1102 may be achieved.

Seating assembly 1100 may further include the ability to rotate seat 1102 independent of seating adjustment assembly 1120. Seat 1102 may be rotated to near vertical, or completely vertical, with the top of seat 1102 facing forward, so that an operator may use seat 1102 as a back rest, or a support to lean against, or sit against. In one embodiment, front upstanding frame members 1108 and rear upstanding frame members 1106 may be vertically adjustable. Rear upstanding members 1106 may be adjusted vertically upward, which in turn rotates seat 1102 forwardly. Front upstanding frame members 1108 may be adjusted vertically downward, which in turn rotates seat 1102 forward. In various embodiments, rear upstanding frame members 1106 may be adjusted vertically upward while front upstanding members may simultaneously be adjusted vertically downward, which in turn rotates seat 1102 forward. In various embodiments, rear upstanding frame members 1106 and front upstanding frame members 1108 may be vertically adjusted using hydraulics, a shaft clamp, pin style discrete positions, or other methods of vertical adjustment.

In various embodiments, seat frames 1104 may comprise additional mounting points, defining additional rotational axis, similar to first seat rotation axis 1103 and second seat rotation axis 1105. For example, as shown in FIG. 19A, front upstanding frame member 1106 may be removably coupled from frame member 1104 and may be moved to couple about a fifth seat rotation axis 1105A. Seat 1102 may then be rotated downwardly without changing the overall length of front upstanding member 1108. In various embodiments, as shown in FIG. 19B, frame members 1104 may include channels 1104A in which sleeves 1107 may move and affect the angle of seat 1102.

Referring again to FIGS. 15-16, vehicle 1002 may include a hitch receiver 1190. Hitch receiver 1190 is received underneath seat 1102 and between frame members 1104. In various embodiments, hitch receiver 1190 extends the entire width between frame members 1104. In various embodiments, hitch receiver 1190 is coupled, or mounted to, either frame member 1104 or an underside of seat 1102. In various embodiments, hitch receiver 1190 may be mounted to cover 1122, or U-shaped brackets 1124. Hitch receiver 1190 may be coupled using fasteners, welding process, or other coupling process. Hitch receiver 1190 may be a 1¼" sized hitch or, alternatively, hitch receiver 1190 may be a 2", 2½", or 3" hitch or any size between approximately 1-5 inches. Hitch receiver 1190 is positioned generally longitudinally, so that hitch receiver 1190 may receive components located generally behind vehicle 1002.

Hitch receiver 1190 may be configured to receive an accessory or other component. Hitch receiver 1190 may also be configured to mount vehicle 1002 to a wall, a vehicle, a storage rack, or other mounting component with a hitch to fit into hitch receiver 1190.

In various embodiments, hitch receiver 1190 may receive a platform (not shown) configured to be a storage space. The storage space may also be configured to retain a golf bag (not shown). The storage space may further be configured to detect when a golf bag, or other item, is present on storage space.

Figure 20:
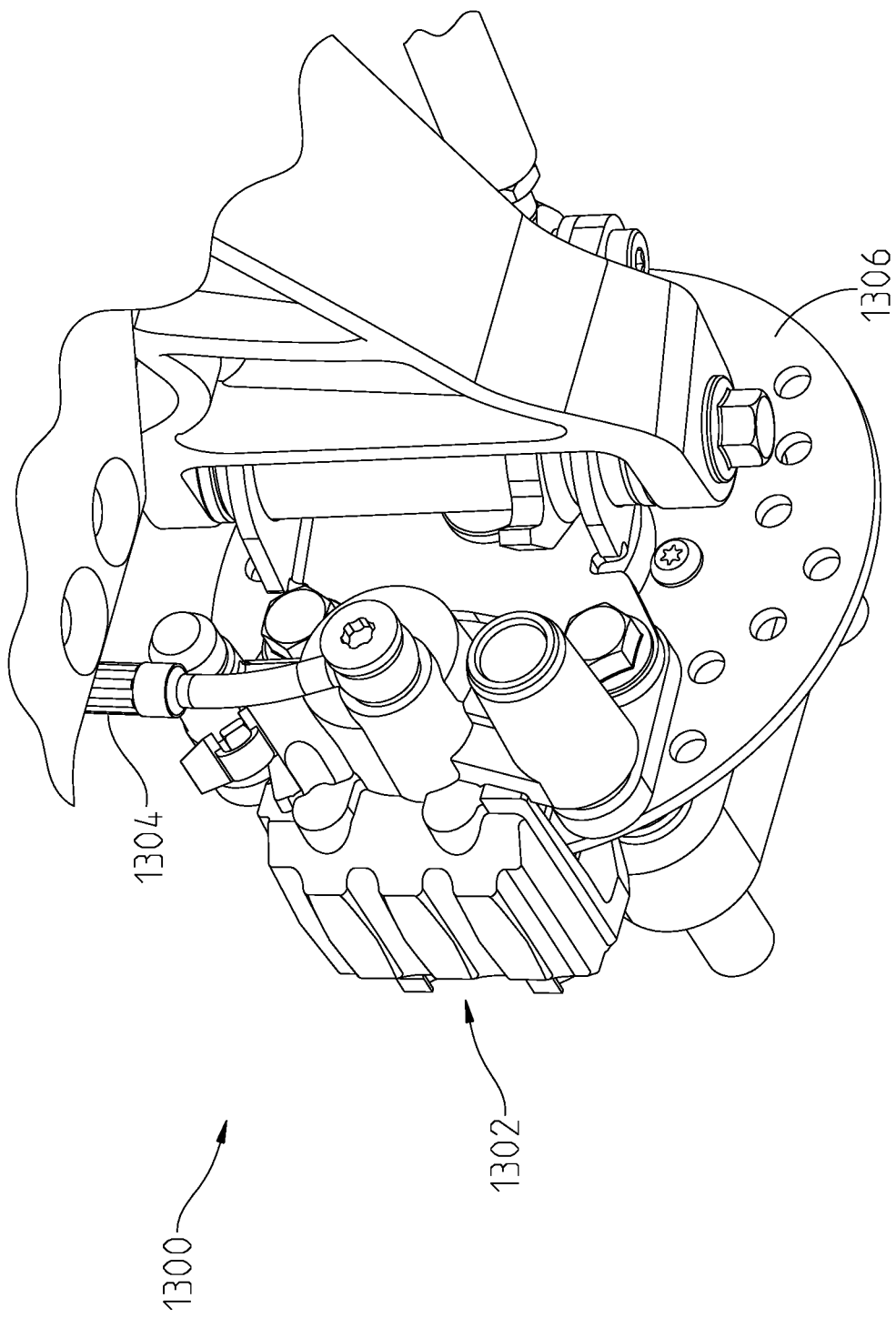
FIG. 20 is a perspective view of a braking system of the vehicle of FIG. 15.
Figure 21:
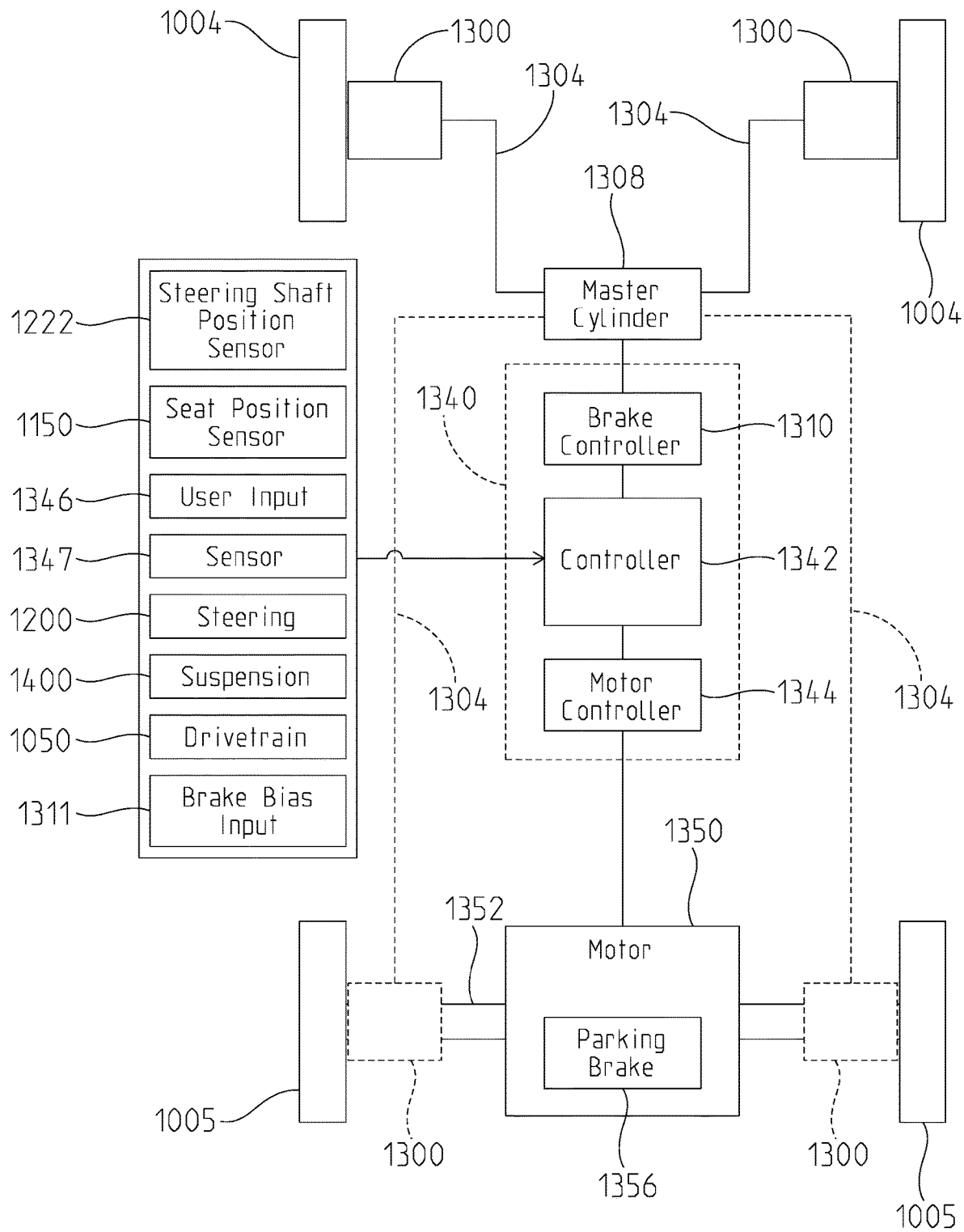
FIG. 21 is a schematic diagram of an embodiment of the vehicle of FIG. 15.
Figure 22:
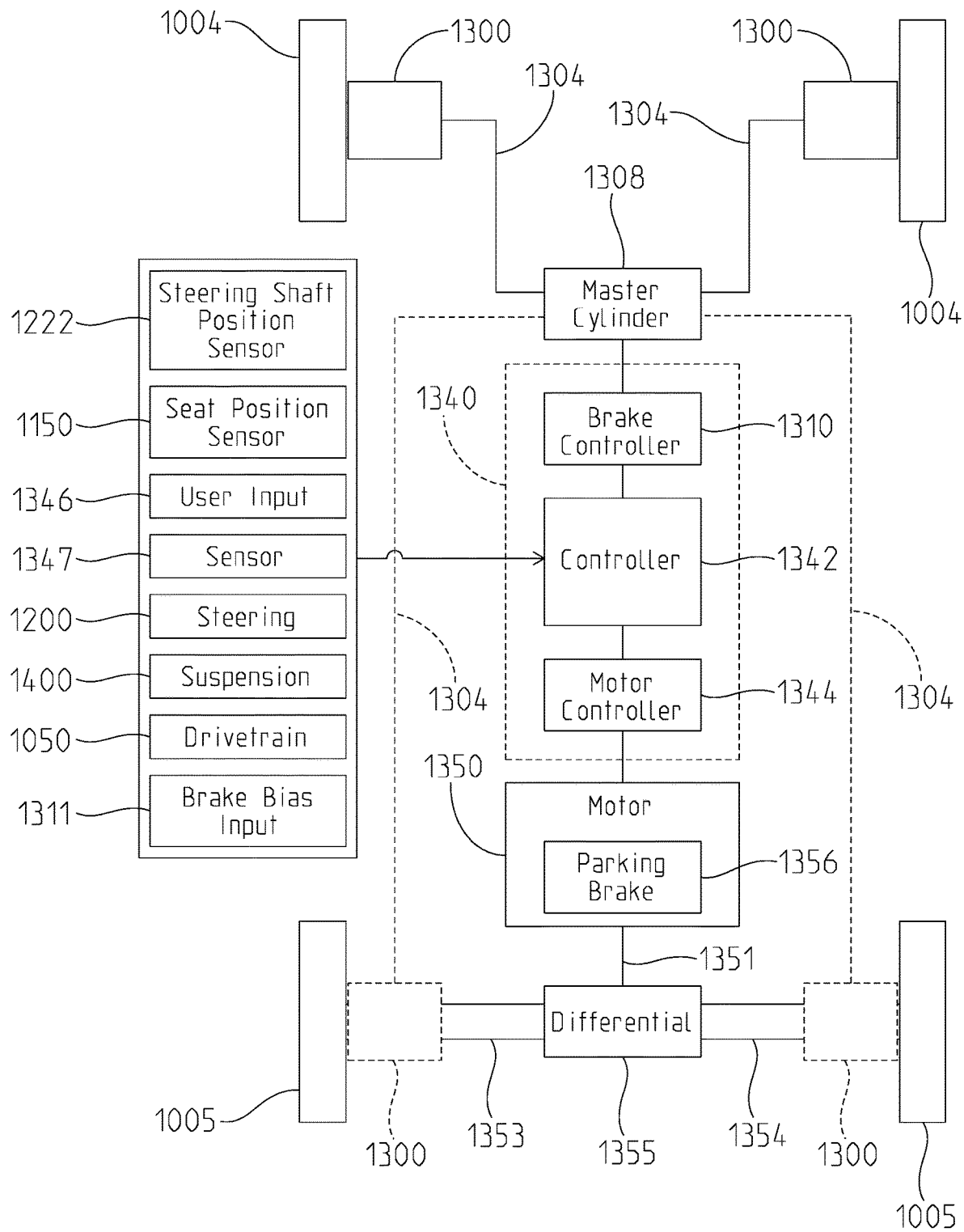
FIG. 22 is a schematic diagram of an embodiment of the vehicle of FIG. 15.

Now turning to FIGS. 20-22, vehicle 1002 includes a braking system 1300, including a caliper 1302, a brake line 1304, and a rotor 1306. In various embodiments, each ground engaging member 1004, 1005 may include a caliper 1302, brake line 1304, and rotor 1306. In various embodiments, only one front ground engaging member 1004 includes caliper 1302, brake line 1304, and rotor 1306. In various embodiments, only one of rear ground engaging members 1005 includes a caliper 1302, brake line 1304, and rotor 1306. In various embodiments, both front ground engaging members 1004 include a caliper 1302, brake line 1304 and rotor 1306. In various embodiments, any combination of front ground engaging members 1004 and rear ground engaging members 1005 include caliper 1302, brake line 1304 and rotor 1306.

Vehicle 1002 also includes a motor 1350 disposed between rear ground engaging members 1005. Vehicle 1002 includes a control system 1340 including a controller 1342, a motor controller 1344 and a brake controller 1310. In various embodiments, controllers 1342, 1344, 1310 may be a single unit, or in various embodiments, controllers 1342, 1344, 1310 may be individual units. Motor controller 1344 receives signals from controller 1342, and further provides output signals to motor 1350.

In various embodiments, motor 1350 is an electric motor coupled to a rear axle 1352. In various embodiments, motor 1350 is an axial flux motor positioned about rear axle 1352 and configured to provide rotational motion to rear axle 1352. Axial flux motor 1350 is configured to provide flux lines generally parallel to rear axle 1352. In various embodiments, axial flux motor is directly coupled to, and provides rotational motion to rear axle 1352. Motor 1350 is laterally aligned along a vehicle centerline. In various embodiments, motor 1350 may be laterally offset of a vehicle centerline. In various embodiments, motor 1350 may be directly coupled to one of the rear ground engaging members 1005.

In various embodiments, motor 1350 is generally aligned along the vehicle centerline, providing rotational power to a drive shaft 1351. Motor 1350 may be an axial flux motor providing axial flux lines parallel to drive shaft 1351. Illustratively, drive shaft 1351 is coupled to a differential 1355 and is configured to transfer rotational power from drive shaft 1351 to drive shaft 1353 and drive shaft 1354. Differential 1355 is configured to allow both rear ground engaging members 1005 to rotate at different speeds.

Motor 1350 may also be a radial flux motor or any other suitable electric motor. Motor 1350 may also be configured to provide braking power to vehicle 1002. Control system 1340 may provide negative torque signals to motor 1350 or may further provide no torque signals to motor 1350 to provide a braking force to vehicle 1002. Additional details regarding motor braking may be found in U.S. Application No. 63/301,884, filed Jan. 21, 2022, titled AUTONOMOUS-READY SYSTEMS FOR VEHICLES Braking system 1300 may include one or more master cylinder(s) 1308 comprising an output coupled to the brake lines 1304. Master cylinder 1308 is communicatively coupled to brake controller 1310 of control system 1340. Control system 1340 is configured to transmit and receive signals from master cylinder 1308, and the signals determine a brake pressure to be provided to each braking system 1300. Brake controller 1310 provides signals for master cylinder 1308 to provide hydraulic pressure through brake lines 1304 to calipers 1302 of the braking system 1300.

Vehicle 1002 further comprises an input 1346 configured to be switched, actuated, or otherwise engaged by an operator. In various embodiments, user input 1346 may include a plurality of inputs. Inputs may be a brake pedal, an accelerator pedal, a button, a trigger, a dial, or other input. In the present embodiment, an input 1346 may be configured to indicate a brake force request from a user. Illustratively, the brake force request may be a total brake force requested by a user. User input 1346 is communicatively coupled to control system 1340, and in the present embodiment, user input 1346 provides a brake force request to controller 1342.

In various embodiments, a brake force request signal is transmitted directly between user input 1346 and brake controller 1310.

Control system 1340 is configured to distribute total braking force between the various braking force outputs front ground engaging members 1004, rear ground engaging members 1005, and motor 1350. In the present embodiment, control system 1340 distributes a first proportion of the total braking force to front ground engaging members 1004 and a second proportion of the total braking force to motor 1350, and the first proportion and the second proportion comprise the total braking force. In various embodiments, control system 1340 distributes a first proportion of the total braking force to front ground engaging members 1004, a second proportion of the total braking force to motor 1350, and a third proportion of the total braking force to motor 1350, and the first proportion, the second proportion, and the third proportion comprise the total braking force. In various embodiments, control system 1340 distributes a first proportion of the total braking force to front ground engaging members 1004 and a second proportion of the total braking force to rear ground engaging members 1005, and the first proportion and the second proportion comprise the total braking force. In various embodiments, control system 1340 distributes a first proportion of the total braking force to rear ground engaging members 1005 and a second proportion of the total braking force to motor 1350, and the first proportion and the second proportion comprise the total braking force.

Braking system 1300 includes master cylinder 1308 which comprises an output coupled to the brake lines 1304. In the present embodiment, vehicle 1002 may receive braking force from brake system 1300 coupled to front ground engaging members 1004 and braking force from motor 1350. Control system 1340 is configured to provide signals requesting a braking force bias between the front and rear of the vehicle by proportioning brake force between front ground engaging members 1004, rear ground engaging members 1005, and motor 1350 of the vehicle 1002. In various embodiment, control system 1340 is configured to request a first braking force from brake controller 1310 and a second braking force from motor controller 1350. In various embodiments, vehicle 1002 may receive braking force from brake system 1300 coupled to front ground engaging members 1004 and from brake system 1300 coupled to rear ground engaging members 1005 and may further receive a braking force from motor 1350. Control system 1340 may be configured to request a first braking force from brake system 1300 coupled to front ground engaging members 1004, a second braking force from brake system 1300 coupled to rear ground engaging members 1005, and a third braking force from motor 1350.

In various embodiments, braking from motor 1350 may be prioritized. That is, control system 1340 may first request a braking force from motor 1350 to determine if motor 1350 is able provide the total brake force requested from user input 1346. If control system 1340 determines that the braking force supplied from motor 1350 is less than the total requested braking force, control system 1340 may then request braking force from either front ground engaging members 1004 or rear ground engaging members 1005. Control system 1340 may then prioritize braking from first ground engaging members 1004 or rear ground engaging members 1005. In various embodiments, determining if a braking force supplied from motor 1350 is sufficient to provide total brake force request includes measuring a change in speed, a deceleration rate, or other vehicle characteristic.

Control system 1340 may distribute braking force based upon predetermined proportioning. In one example, braking is evenly distributed between front ground engaging members 1004, rear ground engaging members 1005, and motor 1350. In another example, front ground engaging members 1004 are configured to provide 50% of the total braking force, while rear ground engaging members 1005 and motor 1350 are configured to each provide 25% of the total braking force. In another example, when a low braking force is requested, motor 1350 is configured to provide the total braking force. In various embodiments, control system 1340 may prioritize braking with motor 1350, and request a maximum braking force from motor 1350, and supplement motor 1350 with braking from front ground engaging members 1004 to meet the total requested braking force. In various embodiments, a user may determine the bias, or proportion of braking force, between front ground engaging members 1004, rear ground engaging members 1005, and motor 1350. A user may provide a user input 1346 providing a desired brake force bias of vehicle 1002. That is, a user input 1346 may determine what proportion of braking force is distributed between front ground engaging members 1004, rear ground engaging members 1005, and motor 1350. In various embodiments, control system 1340 may vary the proportions distributed to front ground engaging members 1004, rear ground engaging members 1005, and motor 1350 based upon a vehicle characteristic such as speed, acceleration, steering angle from steering system 1200, suspension mode from suspension system 1400, drivetrain mode from drivetrain 1050, or other vehicle characteristic.

Control system 1340 may further include instructions for active brake biasing using brake systems 1300 and motor 1350. Control system 1340 may provide instructions to proportion braking force left to right on vehicle 1002. In one embodiment, if vehicle 1002 is making a left turn, control system 1340 may instruct left brakes, or inside brakes, to provide a higher braking force than the right brakes, or outside brakes, allowing vehicle 1002 to have a smaller turning radius. In another embodiment, if vehicle 1002 is making a right turn, control system 1340 may instruct right brakes, or inside brakes, to provide a higher braking force than the left brakes, or outside brakes, allowing vehicle 1002 to have a smaller turning radius. Vehicle 1002 may further include a separate brake bias input 1311 configured to engage brake biasing, disengage brake biasing, or change between brake biasing modes. Brake bias input 1311 may be a button, trigger, switch, or other form of input positioned adjacent a foot of the operator, in operator platform 1010, or may further be positioned on a handlebar 1210, or the center console 1250. Additional details regarding brake biasing may be found in U.S. application Ser. No. 16/401,933, filed May 2, 2019, titled OPERATING MODES USING A BRAKING SYSTEM FOR AN ALL TERRAIN VEHICLE; U.S. application Ser. No. 17/235,322, filed Apr. 20, 2021, titled SYSTEMS AND METHODS FOR OPERATING AN ALL-TERRAIN VEHICLE, the entire disclosures of which are expressly incorporated herein.

In various embodiments, braking may be adjusted based upon a detected orientation of the vehicle. Vehicle 1002 may further include a sensor 1347 supported by the vehicle 1002. Sensor 1347 may be an accelerometer, a gyroscope, or an inertial measurement unit (IMU). Sensor 1347 may be configured to detect a pitch, a roll, or a yaw of the vehicle. Sensor 1347 may be a group of sensors configured to detect a weight (or downward force) at each ground engaging member 1004, 1005. In various embodiments, control system 1340 may bias braking forces between front ground engaging members 1004, rear ground engaging members 1005, and motor 1350 based upon a value of sensor 1347. In one example, if a forward yaw value is detected (e.g., vehicle 1002 is experiencing a dive), a greater proportion of the requested brake force may be directed towards the rear of the vehicle (i.e., rear ground engaging members 1005, motor 1350) to help prevent vehicle 1002 from diving forward.

In various embodiments, motor 1350 includes a parking brake 1356. Parking brake 1356 may be a solenoid parking brake. Solenoid brake may comprise a rod configured to actuate, and when the rod is actuated the rod prohibits motor 1350 from rotating further. Parking brake 1356 is communicatively coupled to control system 1340, and control system 1340 may send actuating signals to parking brake 1356. In various embodiments, parking brake 1356 is communicatively coupled to controller 1342. In various embodiments, parking brake 1356 is communicatively coupled to brake controller 1310. Control system 1340 may send a locking signal to parking brake 1356, and in response, parking brake 1356 may actuate to a locked, or extended position and prevent motor 1350 from rotating further. Control system 1340 may send an unlocking signal to parking brake 1356, and in response, parking brake 1356 may actuate to an unlocked, or compressed position and allow motor 1350 to rotate. In the present embodiment, control system 1340 may send a locking signal to parking brake 1356 any time vehicle 1002 comes to a complete stop. That is, when control system 1340 detects a vehicle speed of zero, parking brake 1356 may be actuated. Further, user input 1346 may be parking brake input, and actuation of the user input 1346 may actuate parking brake 1356 between an unlocked position and a locked position.

Now referring to FIGS. 23A-23C, center console 1250 will be described in greater detail. Center console 1250 is coupled to steering system 1200 and positioned intermediate handlebars 1210. Center console 1250 is positioned so that a user may more easily view, reference, and interact with center console 1250. Center console 1250 is further configured to hold a mobile device 1290. Mobile device 1290 may be a mobile phone, a tablet, a computer, another handheld device, or another visual device.

Center console 1250 includes a body 1270 configured with an apex 1273 defining a vertically highest point of body 1270. Body 1270 further includes a face 1271 and a front body 1274. Face 1271 extends rearwardly and downwardly (i.e., towards the operator) from apex 1273 at an angle and is configured to receive mobile device 1290. Illustratively, face 1271 is positioned at an angle 1276 from vertical, and the face 1271 receives the mobile device 1290 and an operator of vehicle 1002 may view the screen of mobile device 1290 at angle 1276. In the present embodiment, angle 1276 is approximately 45 degrees. In various embodiments, angle 1276 is between 15-90 degrees and, more particularly, is between 30-60 degrees. Body 1270 further includes a shelf 1272 positioned at a bottom extent of face 1271. Shelf 1272 extends rearwardly and perpendicularly from face 1271 and includes a lip 1277 extending upwardly, and shelf 1272 and lip 1277 retain mobile device 1290 when mobile device 1290 is placed on front face 1271. Body 1270 further includes front body 1274 which extends forwardly (i.e., away from the operator) and is generally rounded to create a recess 1278. Front body 1274 further includes a retention clip 1279 configured to retain a securing or retention member (e.g., a bungee cable 1275). Retention clip 1279 may retain the retention member (e.g., cable 1275) through compression means, through pinned means, or other means capable of securing the retention member to front body 1274. Illustratively, the retention member is configured as cable 1275 which may be made of rubber, synthetic rubber, nylon, polypropylene, polyester, cotton or any other suitable material with elastic characteristics.

Center console 1250 includes cover 1260 positioned atop body 1270. Cover 1260 includes rear edge 1267 and front edge 1268, and middle body 1265. Cover 1260 includes cavity 1266 on a bottom side of middle body 1265. Cavity 1266 receives and retains cable 1275, thereby coupling cover 1260 to body 1270. When center console 1250 does not include mobile device 1290, rear edge 1267 is configured to contact apex 1273, and front edge 1268 is configured to contact front body 1274. Cable 1275 is elastic, and therefore, cover 1260 may be pulled up and away from contact with front body 1274 and may naturally be biased into contact with body 1270. Illustratively, front edge 1268 is contoured to interface with the contours of front body 1274 and rear edge 1267 is configured to interface with apex 1273. Apex 1273 may include a dimple configured to receive a point of rear edge 1267. A recess 1262 is positioned adjacent rear edge 1267 and configured to receive mobile device 1290. That is, an upper edge is positioned within recess 1262 and inhibited from moving by rear edge 1267.

Center console further includes a front panel 1251 configured to provide aesthetic appeal to vehicle 1002. Illustratively, front panel 1251 extends forwardly and downwardly from front body 1274 and extends downwardly along a portion of steering shaft 1220. Front panel 1251 also includes an opening 1252, and hand guards 1212 extend laterally through opening 1252.

Figure 23A:
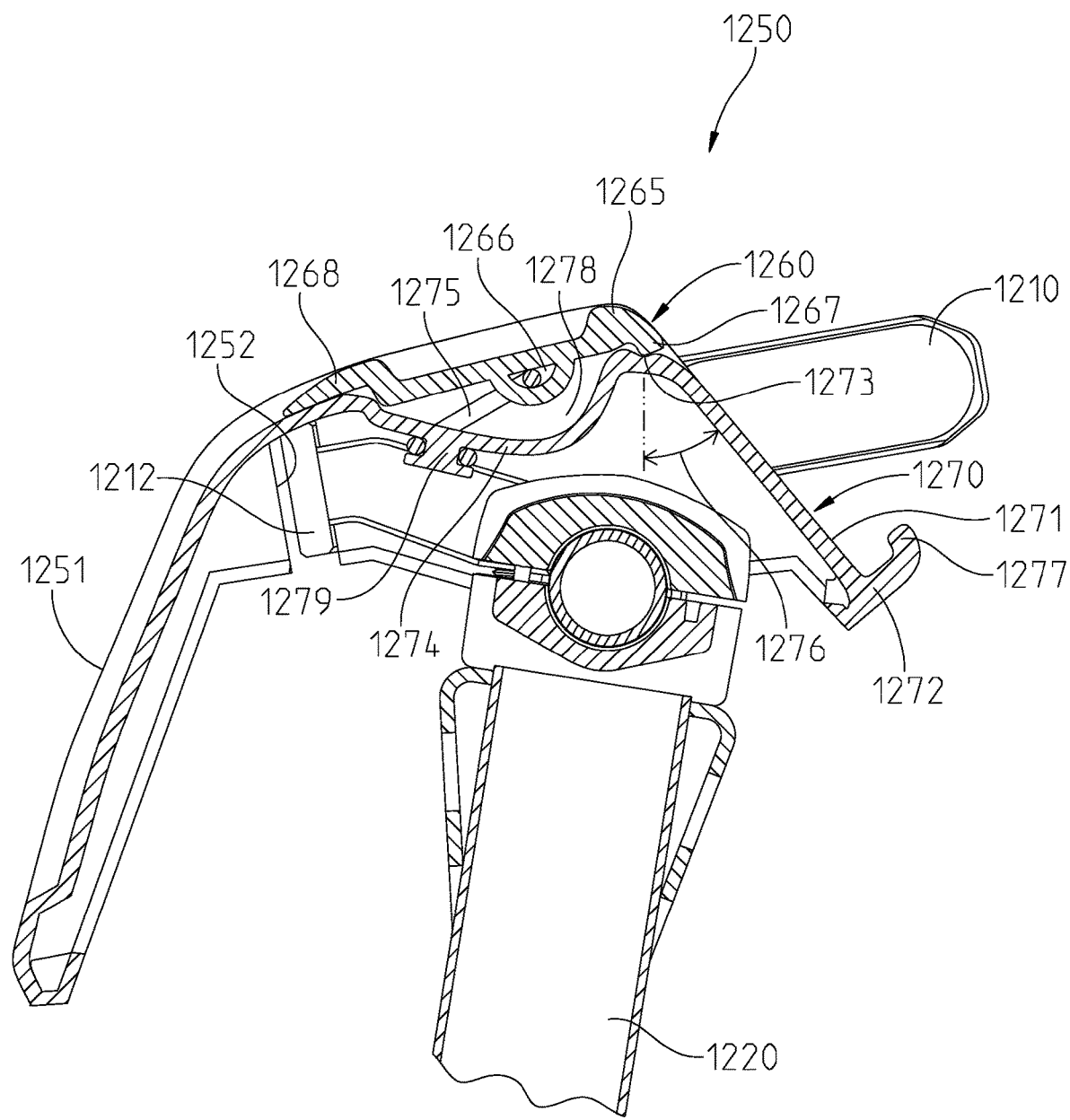
FIG. 23A is a cross-section view of the center console of the vehicle of FIG. 15 shown in a neutral, unextended position, taken along section line 23-23 of FIG. 15.
Figure 23B:
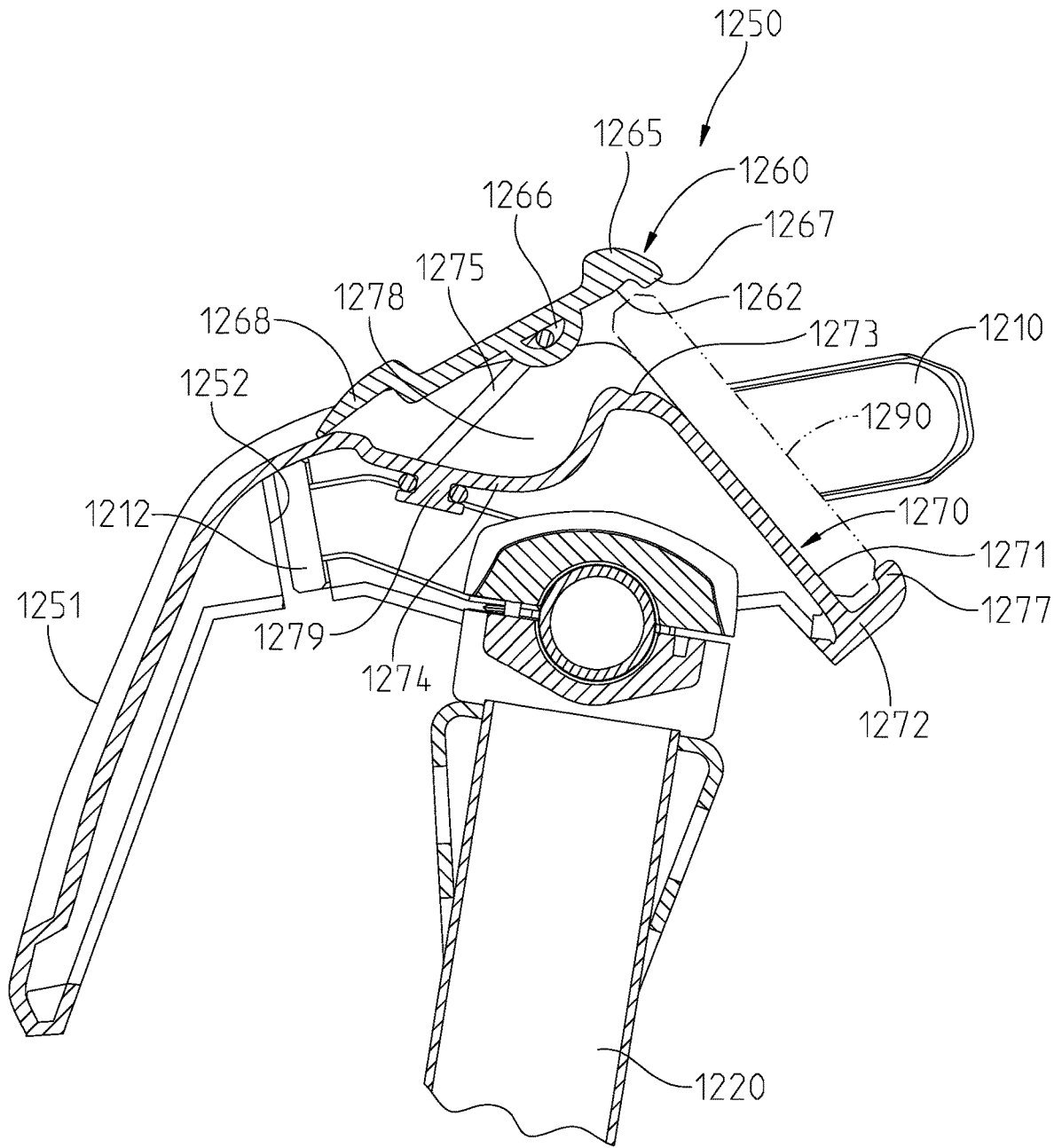
FIG. 23B is a cross-section view of the center console of the vehicle of FIG. 15 shown in an extended position, taken along section line 23-23 of FIG. 15.
Figure 23C:
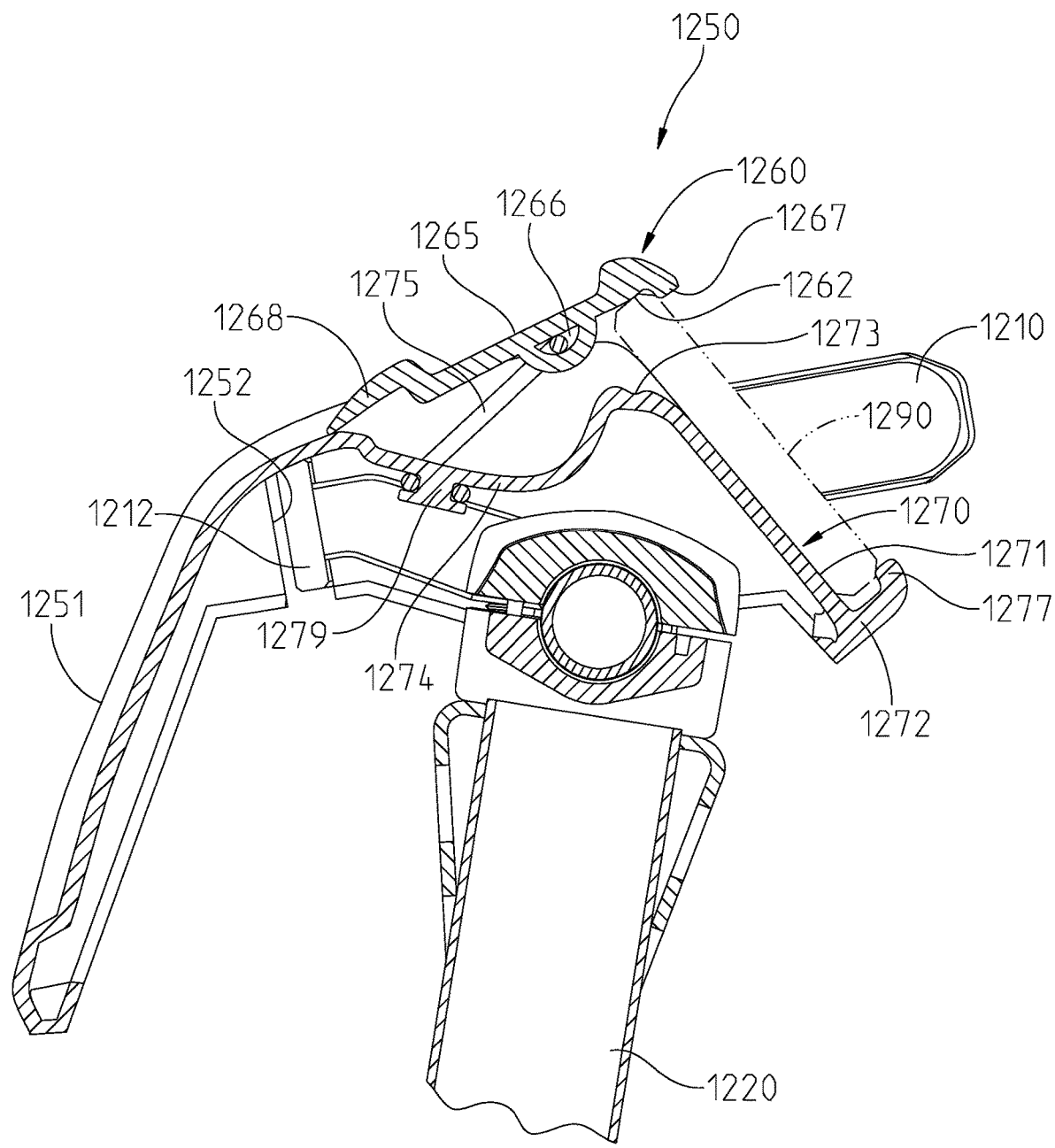
FIG. 23C is a cross-section view of the center console of the vehicle of FIG. 15 shown in a used, installed position, taken along section line 23-23 of FIG. 15.

Now referring to FIG. 23A, center console 1250 is in an unused state, not supporting mobile device 1290. Illustratively, bungee cable 1275 is unstretched, and rear edge 1267 is contacting apex 1273. As cover 1260 is raised, as shown in FIG. 23B, and as a gap is created between rear edge 1267 and apex 1273, mobile device 1290 may be positioned on face 1271. Illustratively, bungee cable 1275 is stretched to a length allowing mobile device 1290 to be placed on face 1271 between shelf 1272 and recess 1262. Mobile device 1290 is retained from moving vertically lower by shelf 1272, and a bottom edge of mobile device 1290 is inhibited from sliding forward by lip 1277. Turning to FIG. 23C, an operator or user may lower cover 1260 such that bungee cable 1275 is slightly less stretched than in FIG. 23B, and cover 1260 contacts an upper edge of mobile device 1290. Illustratively, an upper edge of mobile device 1290 is received within recess 1262. In the present embodiment, bungee cable 1275 pulls downward on cover 1260, providing a downward force on mobile device 1290, thereby keeping mobile device 1290 in place.

Mobile device 1290 is communicatively coupled to controller 1342 using either wireless or wired means. In the present embodiment, mobile device 1290 may communicate with controller 1342 using a WiFi signal, a BTLE (Bluetooth Low Energy) signal, or other wireless type signal. Mobile device 1290 may further communicate with controller 1342 using a wired connection, such as USB, CAN, Ethernet, or other wired connection. Vehicle 1002 may further comprise a permanent cable (not shown) coupled between controller 1342 and center console 1250, and a user may plug the permanent cable into mobile device 1290 to facilitate communication between controller 1342 and mobile device 1290.

Mobile device 1290 may be configured to display a plurality of vehicle characteristics when installed on vehicle 1002 and coupled to controller 1342. Vehicle characteristics may be vehicle speed, vehicle speed limit, time, ride time, directional heading, drive mode, suspension mode, battery level, route directions, battery power output, battery voltage level, battery current level, or other vehicle characteristic. In various embodiments, mobile device 1290 may be configured to display the plurality of vehicle characteristics automatically when mobile device 1290 is paired to controller 1342. In various embodiments, mobile device 1290 includes an application configured to provide a variety of user interfaces for vehicle 1002. Exemplary user interfaces for vehicle 1002 may be found in U.S. Pat. No. 9,324,195, issued Apr. 26, 2016, titled RECREATIONAL VEHICLE INTERACTIVE TELEMETRY, MAPPING, AND TRIP PLANNING SYSTEM; U.S. patent application Ser. No. 15/161,720, filed May 23, 2016, titled DISPLAY SYSTEMS AND METHODS FOR A RECREATIONAL VEHICLE, the entire disclosures of which are expressly incorporated herein. In various embodiments, an operator or a user may select which vehicle characteristics are displayed on mobile device 1290 when mobile device 1290 is communicatively coupled to controller 1342.

Mobile device 1290 may further include a sensor such as an accelerometer (not shown), a gyroscope (not shown), or an inertial measurement unit (not shown). Control system 1340 may be communicatively coupled to the sensor of mobile device 1290, and either the sensor of mobile device 1290 or sensor 1347 of vehicle 1002 may be configured to detect an accident. In various embodiments, mobile device 1290 may comprise an accelerometer, a gyroscope, and/or an inertial measurement unit, and control system 1340 is configured to determine if an accident has occurred using the inputs from the accelerometer, gyroscope, or inertial measurement unit of mobile device 1290. In various embodiments, either of mobile device 1290 or control system 1340 may be configured to receive inputs from sensors on mobile device 1290 and sensor 1347 and compare the values to determine if either sensor is measuring incorrectly, or if a user has removed mobile device 1290 from vehicle 1002. Additional details regarding detecting safety related events may be found in U.S. application Ser. No. 17/506,204, filed Oct. 20, 2021, titled SYSTEMS AND METHODS FOR VEHICLE HAZARDOUS CONDITION DETECTION, the entire disclosure of which is expressly incorporated herein.

Figure 24:
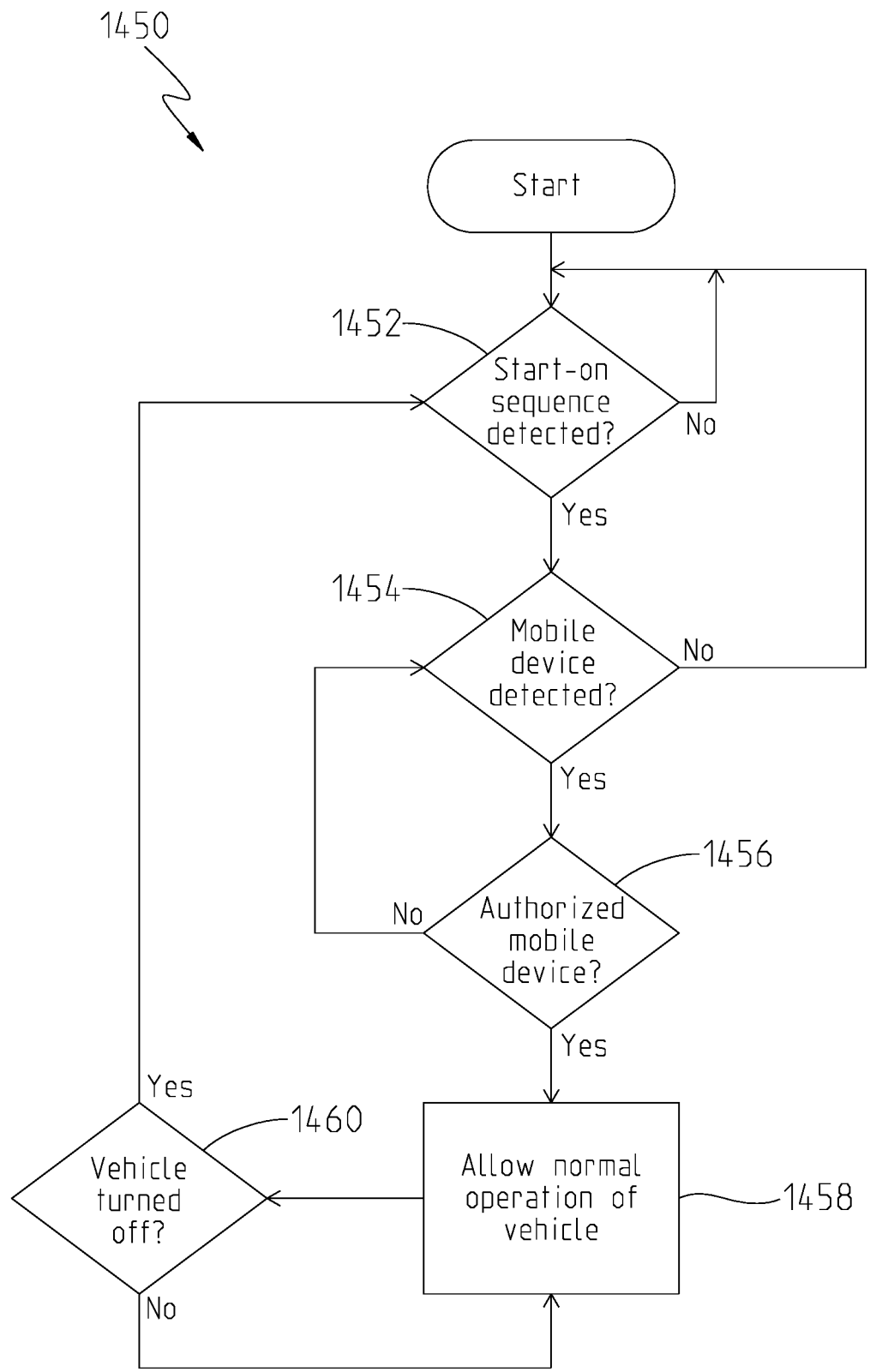
FIG. 24 shows a block diagram of a starting sequence of the vehicle of FIG. 15.

Mobile device 1290 may also act as a key for vehicle 1002. Control system 1340 may require a connection to mobile device 1290 before initiating a start sequence of vehicle 1002. Referring to FIG. 24, a start sequence 1450 is shown, and control system 1340 is configured to detect if a start-on sequence is detected in decision block 1452. Start on sequence may be detected via a user input to a start button (not shown), a key switched on, a detection of an operator (e.g., weight sensors in the operator area), or other indication from an operator of a desire to use vehicle 1002. If a start-on sequence is not detected, process 1450 returns to the start, and goes through start-on sequence detection again.

If a start-on sequence is detected in decision block 1452, process 1450 moves on to decision block 1454 to detect if a mobile device is paired, or connected, to control system 1340 of vehicle 1002. Mobile device may be paired, or connected, via wireless or wired means, as previously discussed. If a mobile device is not detected in decision block 1454, process 1450 returns to the start, and goes through start-on sequence detection again. If a mobile device is detected in decision block 1454, process 1450 moves on to decision block 1456 to determine whether mobile device 1290 is an authorized device. In various embodiments, mobile device 1290 may be an authorized device if it includes an application such as Polaris Ride Command®, or maybe an authentication app configured to provide changing authentication codes. Control system 1340 may be configured to recognize a certain authentication code, a specific user or set of users, or other type of authentication that a user is authorized to operate vehicle 1002. If process 1450 determines that mobile device 1290 is not an authorized mobile device in decision block 1456, process 1450 moves back to decision block 1454. If process 1450 determines that the mobile device is an authorized mobile device, process 1450 moves to block 1458 and allows normal operation of vehicle 1002.

Vehicle 1002 will then continue to operate normally until it is determined that vehicle 1002 is turned off in decision block 1460. When it is determined that vehicle 1002 is turned off in decision block 1460, process 1450 returns to the start and requires authentication again to start vehicle 1002. In various embodiments, process 1450 may include a time delay after vehicle 1002 is turned off in decision block 1460. That is, a user may turn vehicle 1002 off, and control system 1340 may not require authentication if vehicle 1002 is turned back on within a preset time, such as 1 minute, 2 minutes, 3 minutes, 5 minutes, 10 minutes, or more.

In the present embodiment, vehicle 1002 may also be able to operate in a plurality of drive modes. Drive modes may be a first drive mode, a second drive mode, a third drive mode, and potentially more drive modes. Drive modes may be differentiated by varying a throttle map, a braking map, a power consumption map, or other vehicle characteristic. In various embodiments, the first drive mode includes a first throttle map, a first braking map, and a first power consumption map, the second drive mode includes a second throttle map, a second braking map, and a second power consumption map, and a third drive mode includes a third throttle map, a third braking map, and a third power consumption map. First drive mode may be the most aggressive drive mode (i.e., a highest acceleration value on the throttle map, a highest braking force on the braking map, a highest power consumption on the power consumption map). Third drive mode may be a least aggressive drive mode, and second drive mode may be an intermediate, or normal drive mode. In various embodiments, the drive modes may be a sport mode, a comfort mode, and an eco mode, and the sport mode is aggressive and may be focused on high acceleration, comfort mode is standard and focused on ride quality, and eco mode is focused on low power consumption. Additional details regarding drive modes may be found in U.S. Pat. No. 11,110,913, issued Sep. 7, 2021, titled VEHICLE HAVING ADJUSTABLE SUSPENSION; U.S. Pat. No. 10,987,987, issued Apr. 27, 2021, titled VEHICLE HAVING ADJUSTABLE COMPRESSION AND REBOUND DAMPING, the entire disclosures of which are expressly incorporated herein.

Drive modes may be selectable by a user via a user input 1346 or may further be automatically selected by control system 1340. Vehicle 1002 may further comprise a seat position sensor 1150, and the seat position sensor 1150 is configured to detect which position seat 1102 is positioned in. In various embodiments, seat position sensor 1150 is positioned on any of first seat rotation axis 1103, second seat rotation axis 1105, third seat rotation axis 1133, and fourth seat rotation axis 1145, and is a hall effect sensor, a rotary sensor, a gear position sensor, or any other type of sensor that may detect rotation of seat 1102 using seating adjustment assembly 1120. In various embodiments, seat position sensor 1150 is positioned adjacent geared end 1110 and configured to detect which root 1110A, 1110B, 1110C, 1110D that rod 1128 is positioned within. Further, vehicle 1002 may include a steering shaft position sensor 1222 configured to detect a height of steering shaft 1220. Steering shaft position sensor 1222 may be an optical sensor, a resistive sensor, or other type of sensor configured to detect the height of steering shaft 1220. In various embodiments, when seat 1102 is detected to be in a vertically highest position, control system 1340 may be configured to limit a speed or acceleration of vehicle 1002. In various embodiments, when seat 1102 is in a lowest position, control system 1340 may be configured to not limit the speed or acceleration of vehicle 1002. In various embodiments, a user may determine what speed limits or acceleration limits are placed on vehicle 1002 based upon the seat position using a user interface such as mobile device 1290.

In various embodiments, a drive mode may be automatically selected based upon the presence of an accessory on/within hitch receiver 1190 and/or on a platform received by hitch receiver 1190. In one embodiment, when a golf bag is determined to be received by a platform in hitch receiver 1190, control system 1340 may automatically configure vehicle 1002 into the eco mode, or may further limit the speed or acceleration of vehicle 1002.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A convertible recreational vehicle, comprising:
    a pair of front ground engaging members;
    a pair of rear ground engaging members;
    a frame supported by the pair of front ground engaging members and the pair of rear ground engaging members;
    a steering assembly configured to steer the one or more front ground engaging members;
    a seat assembly supported by the frame and configured to support at least one rider;
    a motor configured to drive at least one of: the pair of front ground engaging members and the pair of rear ground engaging members;
    a floor panel including a surface that extends across a width of the floor panel; and
    a divider comprising a first end that is coupled to a front portion of the convertible recreational vehicle and a second end that is configured to contact the seat assembly, wherein the first end is coupled to the front portion in a manner that allows the divider to separate from the seat assembly by rotating about an axis perpendicular to a longitudinal plane of the convertible recreational vehicle.

2. The convertible recreational vehicle of claim 1, wherein the floor panel includes a raised edge along at least one side of the floor panel.

3. The convertible recreational vehicle of claim 1, wherein the steering assembly is translatable along a vertical axis or along an oblique axis relative to the vertical axis.

4. The convertible recreational vehicle of claim 3, further comprising a locking mechanism configured to lock the steering assembly at a positioned height.

5. The convertible recreational vehicle of claim 1, wherein the seat assembly is translatable along a vertical axis or along an oblique axis relative to the vertical axis.

6. The convertible recreational vehicle of claim 5, further comprising a locking mechanism configured to lock the seat assembly at a positioned height.

7. The convertible recreational vehicle of claim 1, wherein the seat assembly is translatable along a horizontal axis.

8. The convertible recreational vehicle of claim 1, wherein the steering assembly comprises at least one headlight.

9. The convertible recreational vehicle of claim 1, wherein the motor is an electric motor configured to be powered by at least one vehicle battery.

10. The convertible recreational vehicle of claim 9, wherein the convertible recreational vehicle includes a first configuration and a second configuration, the first configuration being when the first end of the divider is coupled to the front portion of the convertible recreational vehicle and the second end of the divider is in contact with the seat assembly, and the second configuration being when an unhindered pass-through extends vertically from the surface of the floor panel to a top of the steering assembly and axially between the seat assembly and the steering assembly.

11. The convertible recreational vehicle of claim 1, wherein the floor panel is sized in thickness to accommodate one or more vehicle batteries being integral therewithin.

12. The convertible recreational vehicle of claim 1, wherein the seat assembly includes a hinge mechanism that allows the seat assembly to be tilted forward.

13. The convertible recreational vehicle of claim 1, wherein a ground clearance of the floor panel is greater than six inches and less than twelve inches.

14. The convertible recreational vehicle of claim 1, further comprising a plurality of body panels releasably coupled to the frame.

15. The convertible recreational vehicle of claim 1, wherein the motor is mounted on a rear swing arm of the convertible recreational vehicle.

16. The convertible recreational vehicle of claim 1, wherein the motor is an axial flux motor.

17. The convertible recreational vehicle of claim 1, wherein the floor panel comprises at least one coupler that couples a front portion of the convertible recreational vehicle to a back portion of the convertible recreational vehicle.

18. The convertible recreational vehicle of claim 17, wherein decoupling the at least one coupler decouples the front portion from the back portion.

19. The convertible recreational vehicle of claim 17, further comprising an electronic throttle and a controller, wherein the controller is configured to:
   receive a speed signal from a user device; and
   limit a maximum speed of the convertible recreational vehicle based upon the speed signal.

20. The convertible recreational vehicle of claim 1, further comprising a controller configured to:
   receive a tether signal indicating a user has released at least one of the user's hands from the steering assembly; and
   send a brake signal to a brake of the convertible recreational vehicle.

21. The convertible recreational vehicle of claim 1, further comprising a lockable storage area.

22. The convertible recreational vehicle of claim 21, wherein the lockable storage area is a forward lockable storage area.

23. The convertible recreational vehicle of claim 1, wherein the surface of the floor panel is an upper surface extending longitudinally intermediate one of the pair of front ground engaging members and one of the pair of rear ground engaging members and further extending laterally intermediate at least one of: (i) the pair of front ground engaging members and (ii) the pair of rear ground engaging members.

* * * * *